(12) United States Patent
McKenney et al.

(10) Patent No.: US 7,953,778 B2
(45) Date of Patent: May 31, 2011

(54) EFFICIENT SUPPORT OF CONSISTENT CYCLIC SEARCH WITH READ-COPY UPDATE AND PARALLEL UPDATES

(75) Inventors: Paul E. McKenney, Beaverton, OR (US); Jonathan Walpole, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/123,496

(22) Filed: May 20, 2008

(65) Prior Publication Data

US 2009/0292705 A1 Nov. 26, 2009

(51) Int. Cl.
*G06F 17/00* (2006.01)

(52) U.S. Cl. ........ 707/955; 707/791; 707/795; 707/802; 707/807; 707/823

(58) Field of Classification Search ............ 707/791, 707/795, 802, 807, 823, 955
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 3/1997 | Slingwine et al. | |
| 5,727,209 A | 3/1998 | Slingwine et al. | |
| 5,905,990 A | 5/1999 | Inglett | |
| 6,219,690 B1 | 4/2001 | Slingwine et al. | |
| 6,662,184 B1 | 12/2003 | Friedberg | |
| 6,886,162 B1 | 4/2005 | McKenney | |
| 6,920,469 B2 * | 7/2005 | Cooke et al. ............. | 707/617 |
| 6,996,812 B2 | 2/2006 | McKenney | |
| 7,013,289 B2 * | 3/2006 | Horn et al. ............. | 705/14.51 |
| 7,353,346 B2 | 4/2008 | McKenney et al. | |
| 2001/0003189 A1 * | 6/2001 | Miyazawa et al. ............. | 709/206 |
| 2005/0149634 A1 | 7/2005 | McKenney | |
| 2005/0198030 A1 | 9/2005 | McKenney | |
| 2006/0090104 A1 | 4/2006 | McKenney et al. | |
| 2006/0100996 A1 | 5/2006 | McKenney | |
| 2006/0112121 A1 | 5/2006 | McKenney et al. | |
| 2006/0117072 A1 | 6/2006 | McKenney | |
| 2006/0123100 A1 | 6/2006 | McKenney | |
| 2006/0130061 A1 | 6/2006 | McKenney et al. | |
| 2006/0265373 A1 | 11/2006 | McKenney et al. | |

(Continued)

OTHER PUBLICATIONS

J. Seigh, "RCU + SMR for preemptive kernel/user threads," Linux Kernel Mailing List, May 9, 2005, 2 pages.

(Continued)

*Primary Examiner* — Sana Al-Hashemi
(74) *Attorney, Agent, or Firm* — Walter W. Duft

(57) ABSTRACT

A method, system and computer program product for supporting concurrent updates to a shared data element group while preserving group integrity on behalf of one or more readers that are concurrently referencing group data elements without using locks or atomic instructions. Two or more updaters may be invoked to generate new group data elements. Each new data element created by the same updater is assigned a new generation number that is different than a global generation number associated with the data element group and which allows a reader of the data element group to determine whether the new data element is a correct version for the reader. The new generation numbers are different for each updater and assigned according to an order in which the updaters respectively begin update operations. The global generation number is updated so that when all of the updaters have completed data element update processing, the global generation number will correspond to the new generation number that is associated with the last of the updaters to begin update operations.

20 Claims, 19 Drawing Sheets

U.S. PATENT DOCUMENTS

| | | | |
|---|---|---|---|
| 2007/0083565 A1 | 4/2007 | McKenney | |
| 2007/0101071 A1 | 5/2007 | McKenney | |
| 2007/0226440 A1 | 9/2007 | McKenney et al. | |
| 2007/0266209 A1 | 11/2007 | McKenney et al. | |
| 2008/0033952 A1 | 2/2008 | McKenney et al. | |
| 2008/0040720 A1 | 2/2008 | McKenney et al. | |
| 2008/0082532 A1 | 4/2008 | McKenney | |
| 2008/0120129 A1* | 5/2008 | Seubert et al. | 705/1 |
| 2008/0177994 A1* | 7/2008 | Mayer | 713/2 |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Samna et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Llnux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ASM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

T. Gleixner, "High Resolution Timers/Dynamic Ticks-V2", LWN. net, Oct. 1, 2006, 6 pages.

P. Mckenney, "Sleepable RCU", LWN.net, Oct. 9, 2006, 10 pages.

O. Nesterov, "cpufreq_tsc() as core_initcall_sync", LKML.org, Nov. 19, 2006, 2 pages.

P. McKenney, "Using RCU in the Linux 2.5 Kernel", Kernel Korner, Oct. 1, 2003,11 pages.

A. Kleen, "How to do nothing efficiently or better laziness: No Idle tick on x86-64", 2005, 16 pages.

P. McKenney, "Read-Copy Update Implementations", 2001, 3 pages.

C. Boehm et al', "Searching in High-Dimensional Spaces-Index Structures for Improving the Performance of Multimedia Databases," ACM Computing Surveys, vol. 33, No. 3, Sep. 2001, pp. 322-373.

T. Johnson et al., "Lazy Updates for Distributed Search Structure," ACM O-89791-k92k1931000510337, 1993, pp. 337-346.

J. Zobel et al., "Inverted Files for Text Search Engines," ACM Computing Surveys, vol. 38, No. 2, Article 6, Jul. 2006, pp. 1-56.

M. Herlihy, "A Methodology For Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al, "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN. net, Oct. 8, 2007, 27 pages.

* cited by examiner

EFFICIENT SUPPORT OF CONSISTENT CYCLIC SEARCH WITH READ-COPY UPDATE AND PARALLEL UPDATES

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns improvements to a mutual exclusion mechanism known as "read-copy update," in which lock-free data read operations run concurrently with data update operations.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. For example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is available for the benefit of other read operations that access the data following the update. These other read operations will never see the stale data and so the updater does not need to be concerned with them. However, the updater does need to avoid prematurely removing the stale data being referenced by the first group of read operations. Thus, in the second (deferred update) phase, the old data state is only removed following a "grace period" that is long enough to ensure that the first group of read operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This may be done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization (NBS) or a designated update thread could be used to serialize data updates. Data element B is partially maintained in the linked list by preserving its pointer to element C. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. The pointer from B to C is retained. In this way, r2 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes (or threads within a process) having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU running non-preemptible code (as can other operations that will not be listed here). In some read-copy update implementations adapted for preemptible readers, all read operations that are outside of an RCU read-side critical section are quiescent states.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,442,758, entitled "System And Method For Achieving Reduced Overhead Mutual-Exclusion And Maintaining Coherency In A Multiprocessor System Utilizing Execution History And Thread Monitoring." Another commonly used technique is to have updaters block (wait) until a grace period has completed.

A number of variants of read-copy update have been used in different operating systems. However, all of these implementations make at least one of the following assumptions:
1) Stale data is permissible (for example, in read-copy update-protected routing tables).
2) Readers search the aggregate data structure in an acyclic manner, so that there is no possibility of a reading process seeing two different versions of the same data element during a single operation. This assumption also implies that, for data elements having multiple entry points, a given search starts with only one of these entry points.
3) There is no need for multiple data elements to be seen in a consistent aggregate state. Consistency is important only for a given data element (as, for example, the data structures used in the Linux 2.6 kernel's read-copy update-protected System V IPC (InterProcess Communication) mechanism).
4) If group consistency is important for a collection of data elements, read-copy update must be used in a manner that allows the group to be updated atomically so as to protect group integrity. As used herein, the term "atomic" signifies that the data update operation must complete with the guarantee that no other process will see inconsistent versions of the group data elements. For example, in the Linux 2.6 kernel, the directory-cache is protected by read-copy update, but per-entry locks are also used to ensure that updates to these entries and their associated inodes are in a coordinated consistent state when cache readers access the entries. Another approach would be to make a copy of the aggregate data structure (i.e., the entire collection of data elements), update the new copy, and then link the new copy in place of the old copy. However, this is extremely time consuming for large groups, and is particularly inefficient when only small changes are required.

Cyclic searches represent a situation where none of the foregoing assumptions underlying the use of read-copy update are in play. An example of a commonly used cyclic search is the traversal of a group of data elements representing a finite state machine. If these data elements change dynamically, but infrequently, in comparison to the number of read traversals, then the use of read-copy update could be advantageous. However, it will be seen that:
1) Permitting stale data could result in a reader seeing an inconsistent, and possibly nonsensical, finite state machine.
2) Traversing a finite state machine is in general an inherently cyclic activity.
3) Each reader must see a finite state machine that is consistent as a whole—consistency of a particular state is not sufficient.
4) If the finite state machine is large, implementing atomic data element group updates by group copying will be infeasible.

Commonly owned U.S. Patent Application Publication No. 2005/0198030, naming one of the applicants herein as the sole inventor, addresses the foregoing situation by allowing cyclic readers to see consistent views of multiple independently updated data elements. However, the disclosed technique prohibits parallel updates because updaters are gated by a single global generation counter used by readers to identify different generations of data element updates. The present invention modifies the technique of the '030 publication to support multiple updaters performing updates in parallel. In particular, a new read-copy update technique is disclosed that supports the level of data group consistency required in cyclic searches and other processing environments where group integrity must be preserved relative to each reader, while also permitting parallel updates.

SUMMARY OF THE INVENTION

An advance in the art is obtained by a method, system and computer program product for supporting concurrent updates to a shared data element group while preserving group integrity on behalf of one or more readers that are concurrently referencing group data elements without using locks or atomic instructions. Two or more updaters may be invoked to generate new group data elements. Each new data element created by the same updater is assigned a new generation number that is different than a global generation number associated with the data element group and which allows a reader of the data element group to determine whether the new data element is a correct version for the reader. The new generation numbers are different for each updater and assigned according to an order in which the updaters respectively begin update operations. The updaters may perform update processing on the new data elements by (1) respectively establishing a first version link from each of the new data elements to a prior version thereof having a different generation number, (2) respectively establishing a second version link to each of the new data elements from its prior version, and (3) linking the new data elements into the data element group so that the new data elements are reachable by readers. The global generation number is updated so that when all of the updaters have completed data element update processing, the global generation number will correspond to the new generation number that is associated with the last of the updaters to begin update operations. After a grace period has elapsed, the prior version, the first version link and the second version link for each of the new data elements may be freed.

BRIEF DESCRIPTION OF THE DRAWINGS

The foregoing and other features and advantages of the invention will be apparent from the following more particular description of example embodiments of the invention, as illustrated in the accompanying Drawings, in which.

DETAILED DESCRIPTION OF EXAMPLE EMBODIMENTS

Figure 1A:
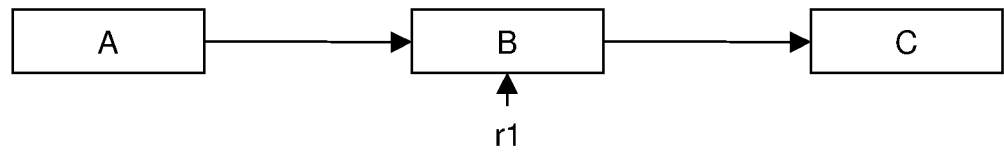
FIGS. 1A-1D are diagrammatic representations of a linked list of data elements undergoing a data element replacement according to a conventional read-copy update mechanism.
Figure 1B:
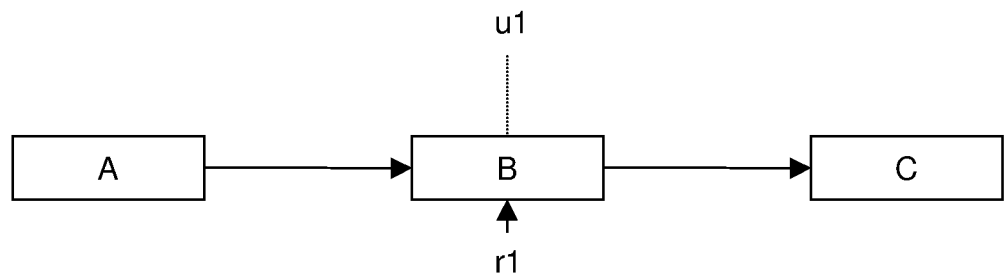
Figure 1C:
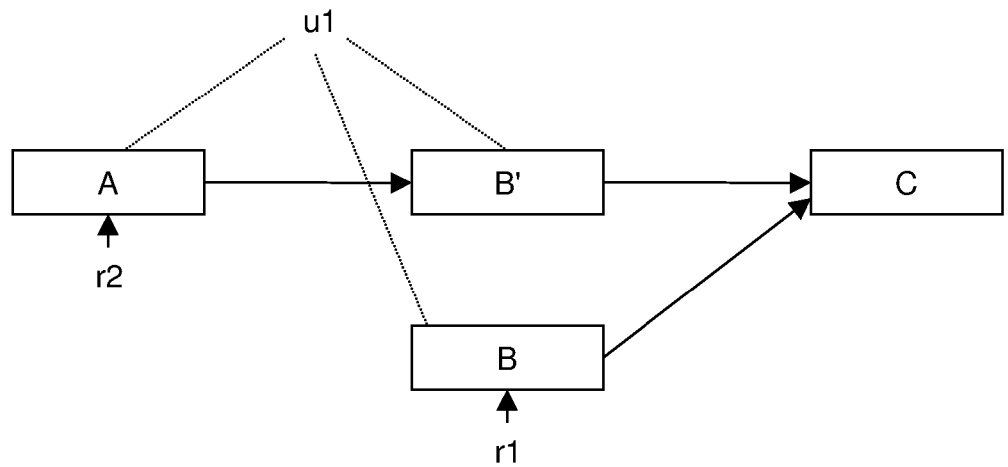
Figure 1D:
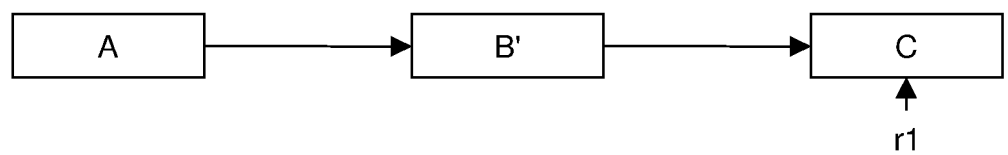
Figure 2A:
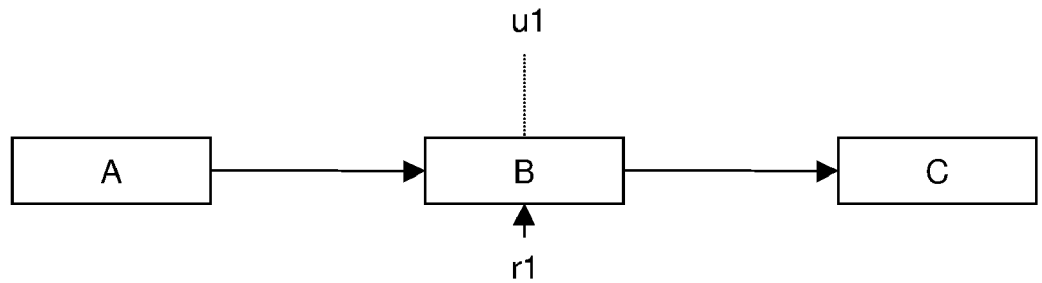
FIGS. 2A-2C are diagrammatic representations of a linked list of data elements undergoing a data element deletion according to a conventional read-copy update mechanism.
Figure 2B:
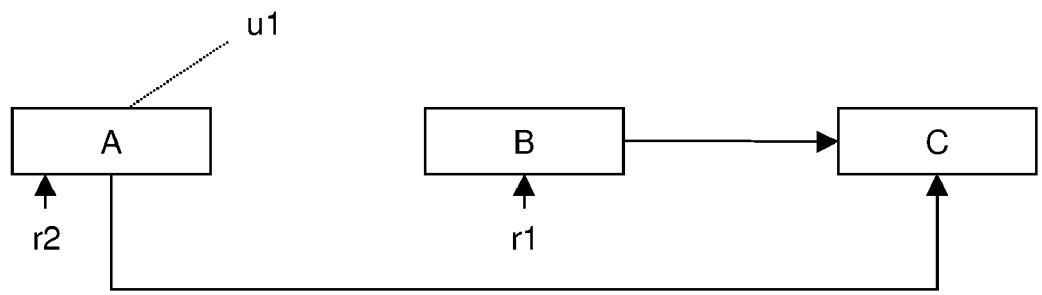
Figure 2C:
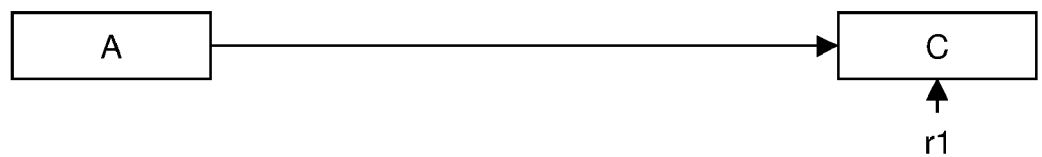
Figure 3:
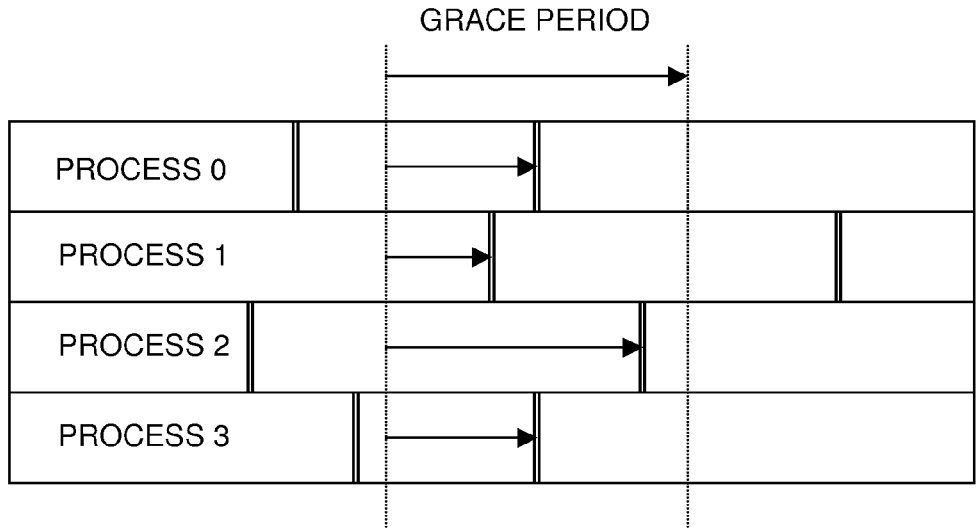
FIG. 3 is a flow diagram illustrating a grace period in which four processes pass through a quiescent state.
Figure 4:
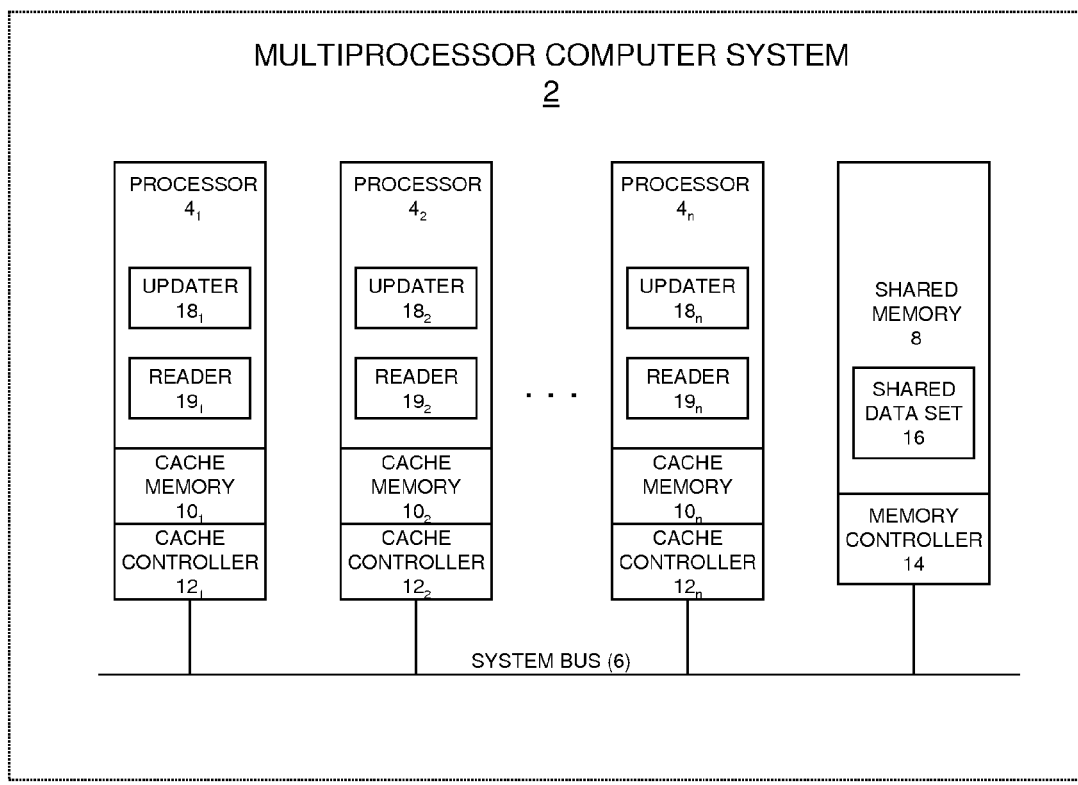
FIG. 4 is a functional block diagram showing an example multiprocessor computing system.

Turning now to the figures, wherein like reference numerals represent like elements in all of the several views, FIG. 4 illustrates an example computing environment in which the present invention may be implemented. In particular, a symmetrical multiprocessor (SMP) computing system 2 is shown in which multiple processors $4_1$, $4_2$ . . . $4_n$ are connected by way of a common bus 6 to a shared memory 8. Respectively associated with each processor $4_1$, $4_2$ . . . $4_n$ is a conventional cache memory $10_1$, $10_2$ . . . $10_n$ and a cache controller $12_1$, $12_2$ . . . $12_n$. A conventional memory controller 14 is associated with the shared memory 8. The computing system 2 is assumed to be under the management of a multitasking operating system adapted for use in an SMP environment. In the alternative, a single processor computing environment could be used, as could a hardware multithreading environment, a multi-core environment and a NUMA (Non-Uniform Memory Access) environment, to name but a few. Furthermore, multiple multitasking operating systems might all run concurrently on the same hardware under the control of a hypervisor, and some or all of these operating systems might implement read-copy update (RCU) synchronization, including the fast path grace period detection technique described herein, as could the hypervisor itself.

It is further assumed that update operations executed within kernel or user mode processes, threads, or other execution contexts will periodically perform updates on a set of shared data 16 stored in the shared memory 8. For purposes of illustration, it will be assumed that the plural processes concurrently referencing the shared data set 16 include data updater operations ("updaters") $18_1$, $18_2$ . . . $18_n$ and data reader operations ("readers") $19_1$ . . . $19_n$, respectively executing on processors $4_2$ . . . $4_n$. As described by way of background above, the updates performed by the data updaters $18_1$, $18_2$ . . . $18_n$ can include modifying elements of a linked list, inserting new elements into the list, deleting elements from the list, and many other types of operations. The read operations $19_1$ . . . $19_n$ will typically be performed far more often than updates, insofar as this is one of the premises underlying the use of read-copy update.

Figure 5:
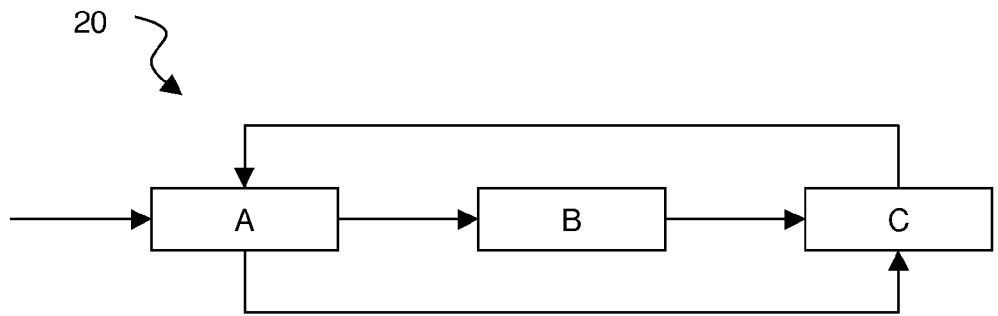
FIG. 5 is a diagrammatic representation of a group of data elements implemented as a cyclic graph that readers traverse by way of cyclic searches.

It is additionally assumed that the shared data set 16 represents a group of data elements that must be updated atomically as a group within a single update operation, so that readers are presented with a consistent view of the data during any given read operation. FIG. 5 illustrates an example of such a data group in the form of a cyclic graph 20 comprising a linked set of data elements A, B and C. As mentioned by way of background above, these linked data elements can be constituted using any suitable programming construct, including but not limited to C-language "struct" (data structure) variables comprising one or more data fields and one or more pointers to other elements in the data group. During a cyclic search (read operation) involving the graph 20, a reader enters the graph by following the global pointer to A. Depending on the processing result generated at A, the reader may either move to B and thence to C, or directly to C. From C, the reader returns to A. It will be seen that if any of the data elements A, B or C is modified or deleted using the conventional read-copy update mechanism, readers will be presented with an inconsistency if they reencounter the data element or find that it has been removed during the same operation. For example, if the graph 20 is a state machine, the logic of a reader encountering the updated data element may be thrown into disarray, possibly causing the reader to take an erroneous action or crash. An inconsistency problem could also occur if a new data element is added while a read operation is in progress.

Figure 6:
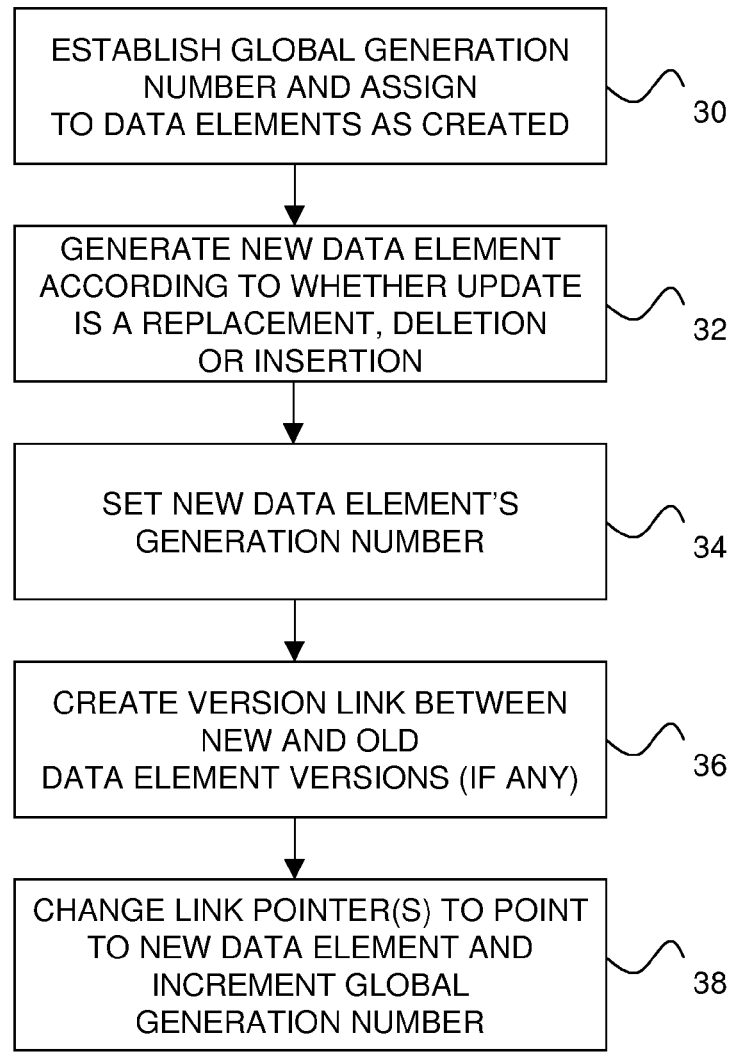
FIG. 6 is a flow diagram showing a generalized prior art method for updating a data element group.

In the '030 publication referred to above in the section entitled "Background of the Invention," a method was disclosed for maintaining data integrity while updating a shared data element group such as the cyclic graph 20. FIG. 6 is illustrative of this prior art technique. In an initialization step 30, a global generation number is established relative to the data element group and each data element in the group is assigned a copy of the global generation number at the time of its creation. In steps 32 and 34, an updater that wishes to replace, delete or insert a group data element generates a new data element, reads the current global generation number, and sets the data element's generation number field to a value that is different (e.g., one greater) than the current global generation number. If the updater is replacing a current data element, the new data element will be a modified copy of the current data element. If the updater is deleting a current data element, the new data element will be a copy of the current data element with a "deleted" flag set. If the updater is inserting a new data element, the new data element is created from scratch. In step 36, the updater sets version links between the new data element and its pre-update version (if such a version exists). Each data element version maintains a set of two version pointers, one being an old-version pointer to a previous version of the data element (if any) and the other being a new-version pointer to a next version of the data element (if any). A NULL old-version pointer is used for any data element having no previous version (i.e., the data element has not been updated since the last grace period or is an insert). A NULL new-version pointer is used for any data element having no next version (i.e., it is the most current version). In step 38, the updater changes any link pointers that point to the old version of the data element to instead point to the new version, and then updates the global generation number by setting it equal to the generation number of the updated data element. Additional read operation details are also described in connection with FIGS. 9-11 of the '030 publication.

Figure 7:
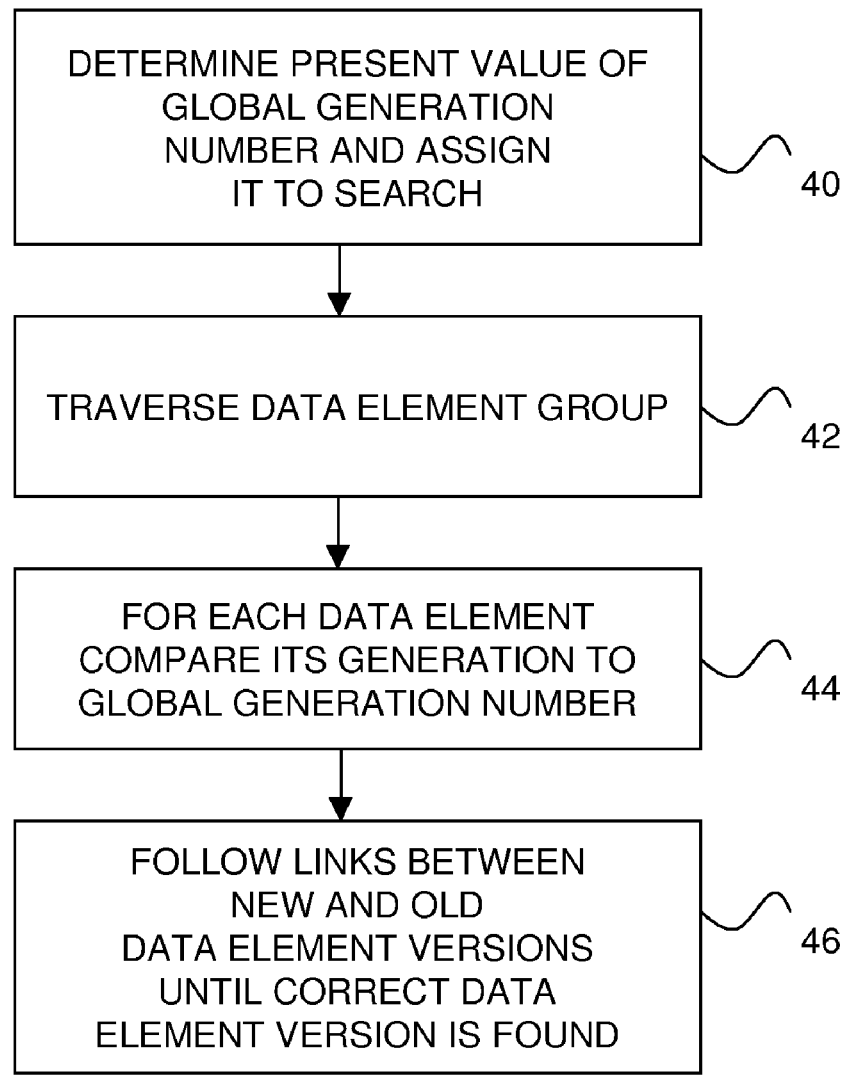
FIG. 7 is a flow diagram showing a generalized prior art method for reading a data element group.

The '030 publication also disclosed methods that may be employed while searching (reading) a shared data element group such as that shown by the cyclic graph 20. FIG. 7 is illustrative of this prior art technique. In step 40, a reader determines the present value of the global generation number and assigns it to the search. In step 42, the reader traverses the data element group following the links between data elements. In step 44, as each data element is read the reader compares the global generation number assigned to the search with the data element's copy of the global generation number to determine if the two generation numbers match (indicating that the data element is valid for this reader). If the data element's generation number does not match that of the reader, then in step 46, the reader follows the data element's version pointers to new and old versions of the data element, as necessary, to find a version that has a matching generation number, if any. Typically, the reader will choose the data element having the largest generation number that is not greater than the reader's generation number. Additional read operation details are also described in connection with FIGS. 12A-12C of the '030 publication.

As previously stated above in the section entitled "Background of the Invention," the update method of FIG. 6 does not support concurrent updates. For example, plural updaters may occasionally perform updates to different data elements at substantially the same time. Using the prior art technique of FIG. 6, the global generation number used by readers to track data element versions effectively gates the updaters insofar only one updater at a time is allowed to proceed through the update cycle. Otherwise, the global generation number would not accurately reflect each update. For example, if there were "n" concurrent updaters, they might each read the same global generation number, set the generation number fields of their respective data elements to "global generation number +1," then update the global generation number to the same value as the various update operations complete. Cyclic data consistency would be lost because the global generation number would not show that "n" updates occurred. Moreover, the updated data elements would all have the same generation number instead of "n" different generation numbers. Readers encountering the updated data elements would incorrectly assume that they belong to the same update generation when in fact they do not. Readers could thus see the cyclic data group, such as the graph 20 of FIG. 5, in an incorrect state.

Figure 8:
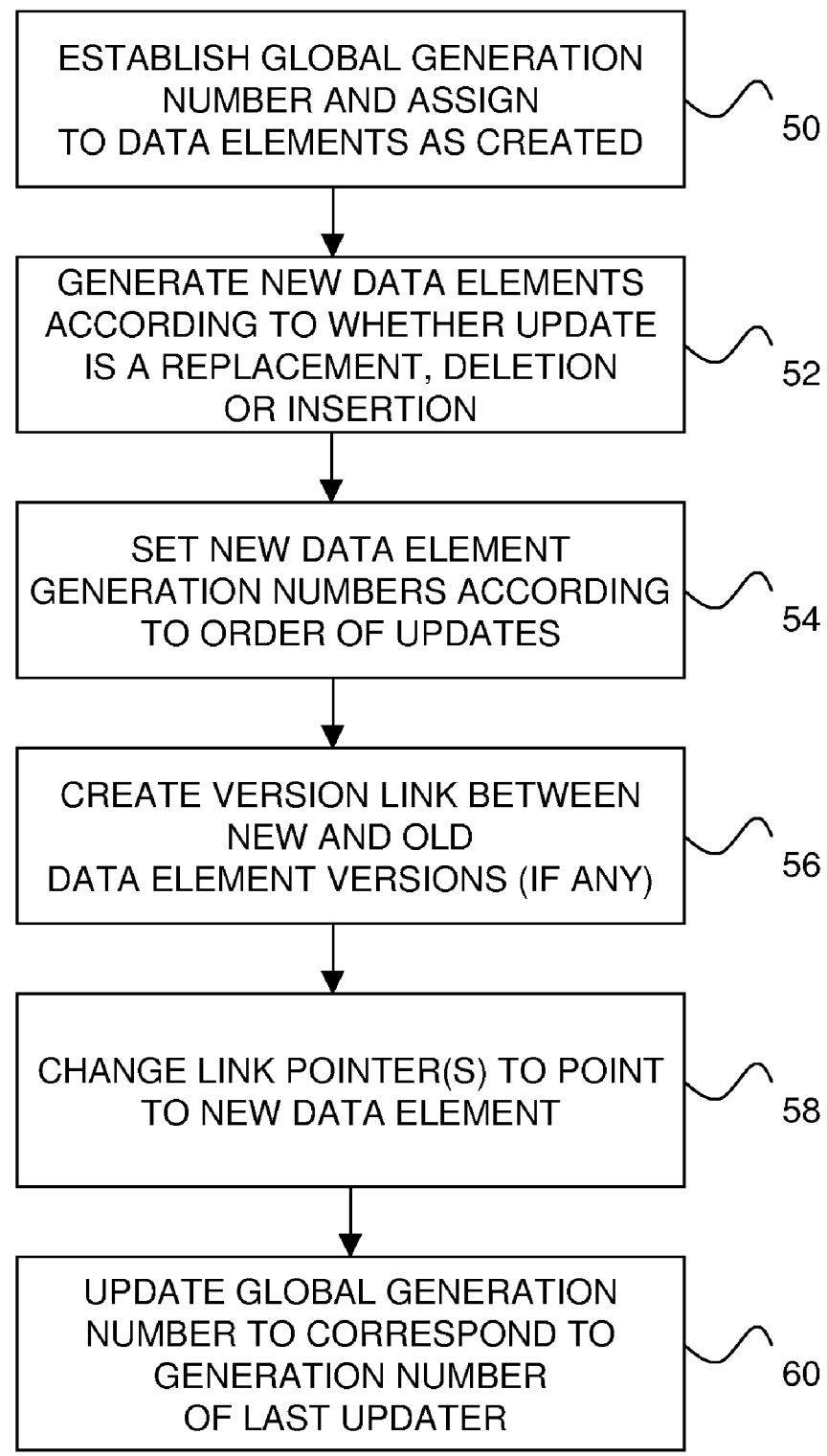
FIG. 8 is a flow diagram showing a generalized method for supporting concurrent updates of a data element group in accordance with the present disclosure.

FIG. 8 illustrates a generalized method that may be employed to maintain data integrity while performing concurrent updates to a shared data element group such as the cyclic graph 20. In step 50, each data element in the group will be initially assigned a copy of the starting global generation number. In step 52, plural updaters that wish to replace, delete or insert a group data element commence update operations substantially concurrently by each generating one or more new data elements (such that there are plural new data elements). These updaters may be referred to as concurrent updaters even though they do not commence update operations at precisely the same time. In this case, the term "concurrent updaters" means that two or more updaters are engaged in update processing during the same time period, i.e., from the time that update operations begin to the time that the global generation number is manipulated to reflect an update. If an updater is replacing a current data element, its new data element will be a modified copy of the corresponding current data element. If an updater is deleting a current data element, the new data element will be a copy of the corresponding current data element with a "deleted" flag set. If an updater is inserting a new data element, the new data element is created from scratch.

In step 54, each updater sets a generation number field in its new data element(s) to a value that is different (e.g., larger or smaller) than the current global generation number associated with the data element group as a whole. The new generation numbers correspond to the order in which each updater begins update operations. Thus, the first new generation number could be one greater than the global generation number, the second new generation number could be two greater than the global generation number, and so on. As described in more detail below, one way that the updaters can maintain their new data elements in separate generations is by cooperatively assigning themselves unique new generation numbers using a global update sequencing number. In particular, each updater can take a snapshot of the global update sequencing number as it commences data update operations, then increment the global value and use the incremented value as its new generation number for new data elements.

In step 56, the updaters set version links between their new data elements and pre-update versions thereof (if such versions exist). Each data element version maintains a set of two version pointers, one being an old-version pointer to a previous version of the data element (if any) and the other being a new-version pointer to a next version of the data element (if any). A NULL old-version pointer is used for any data element having no previous version (i.e., the data element has not been updated since the last grace period or is an insert). A NULL new-version pointer used for any data element having no next version (i.e., it is the most current version). In step 58, the updaters change any link pointers that point to the old version of their data elements to instead point to the new versions.

The updaters will asynchronously complete the data element update processing of steps 56-58, and not necessarily in the order in which they began update operations. In step 60, one or more of the updaters updates the global generation number (in one or more stages if necessary) until the final value corresponds to the most recently issued new generation number of this particular group of updaters. For example, if the global generation number was initially 1 and there are 4 concurrent updaters (with respective new generation numbers of 2, 3, 4 and 5), the last new generation number would be 5. This value would be ultimately assigned to the global generation number so that the latter is also 5. In this way, the data element updates performed by all updaters will be reflected in the global generation number, allowing subsequent readers to use the correct global generation number. This would not be the case if each updater simply set the global generation number as it completed data element update processing without regard to other updaters. As stated, the updaters will not necessarily finish update operations in the order in which they started. Without updater cooperation, the updater with the lowest new generation number of (e.g., 2) might finish last, in which case the global generation number would be 2 (instead of 5). It will be seen from the discussion of FIG. 7 above that this could result in a reader using the wrong data element version. As described in more detail below, the number of times that the global generation number is incremented (each time representing an incrementation stage) depends on the order in which the updaters complete their data element update processing. If the updaters complete according to the order of their new generation numbers, each updater will increment the global generation number by one generation number. On the other hand, if the updaters complete in inverse order, only the last updater will increment the global generation number, but will account for all of the other updaters that preceded it by incrementing to the largest value in the sequence of new generation numbers.

Figure 9A:
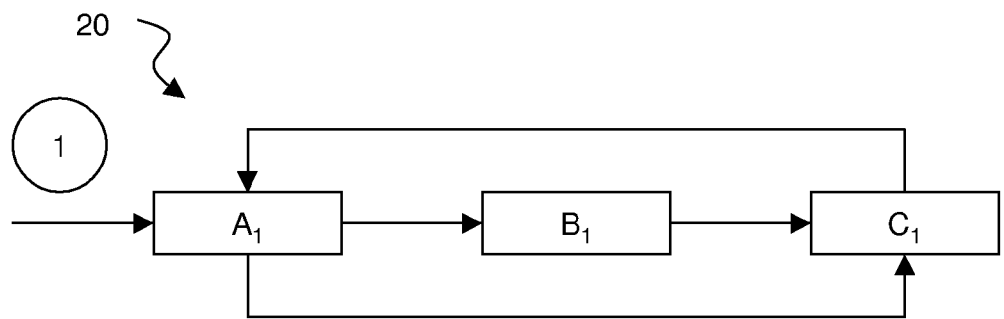
FIGS. 9A-9F are diagrammatic representations of the data element group of FIG. 5 during various stages of an update operation in which elements A and C are updated in accordance with an example implementation of the disclosed technique.

Turning now to FIGS. 9A-9E, an example update of the cyclic graph 20 of FIG. 5 will now be described to illustrate how the method of FIG. 8 can be implemented in a practical application. In FIG. 9A, the cyclic graph 20 is shown with the data elements A, B and C being in an initial state. The subscripts associated with each data element indicate generation number. The global generation number is illustrated by the circled number on the left-hand side of each figure. It is assumed that the graph 20 is to be updated by two concurrent updaters respectively replacing data elements A and C with new versions.

Figure 9B:
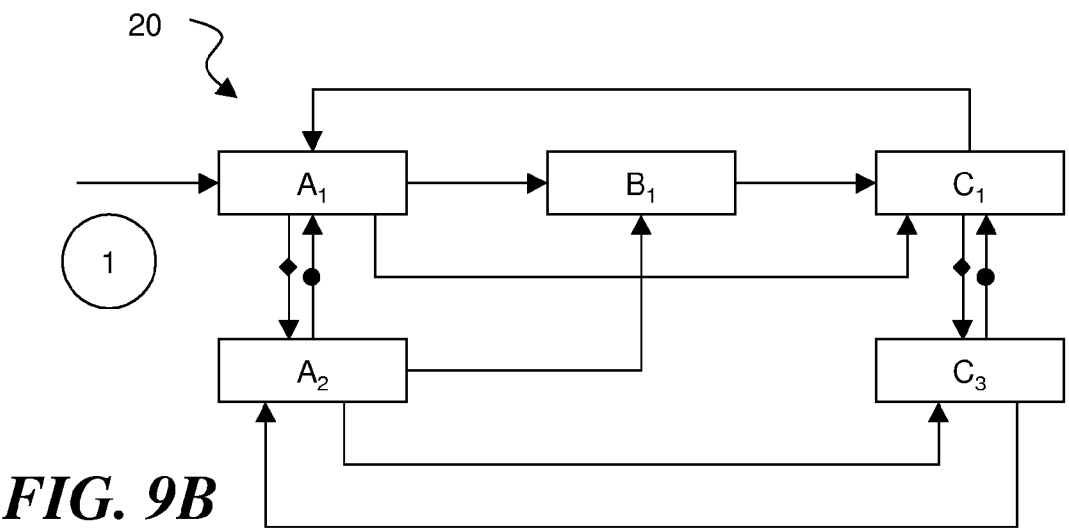

In FIG. 9B, two replacement data elements $A_2$ and $C_3$ are allocated, their corresponding fields are copied from $A_1$ and $C_1$, respectively, link pointers extending to other data elements are established (e.g. $A_2$ to $B_1$ and $C_3$; $C_3$ to $A_2$), and the old/new-version pointers of the old and new data element versions are filled in. The arrows with the circle represent old-version pointers, and the arrows with the diamond represent new-version pointers. Version pointers having NULL values are not shown. The subscripts of the new data elements $A_2$ and $C_3$ reflect the fact that $A_2$ was created prior to $C_3$. In accordance with step 54 of FIG. 8, the updaters responsible for creating $A_2$ and $C_3$ cooperatively assign themselves unique new generation numbers by keeping track of the last assigned generation number. Note that any first generation reader that enters the graph 20 at this point will proceed unaware of the new data elements because the version numbers of the data elements traversed will match the current search generation number. Such readers will not attempt to traverse the new-element pointers from $A_1$ and $C_1$ to $A_2$ and $C_3$ because there is no need to do so.

Figure 9C:
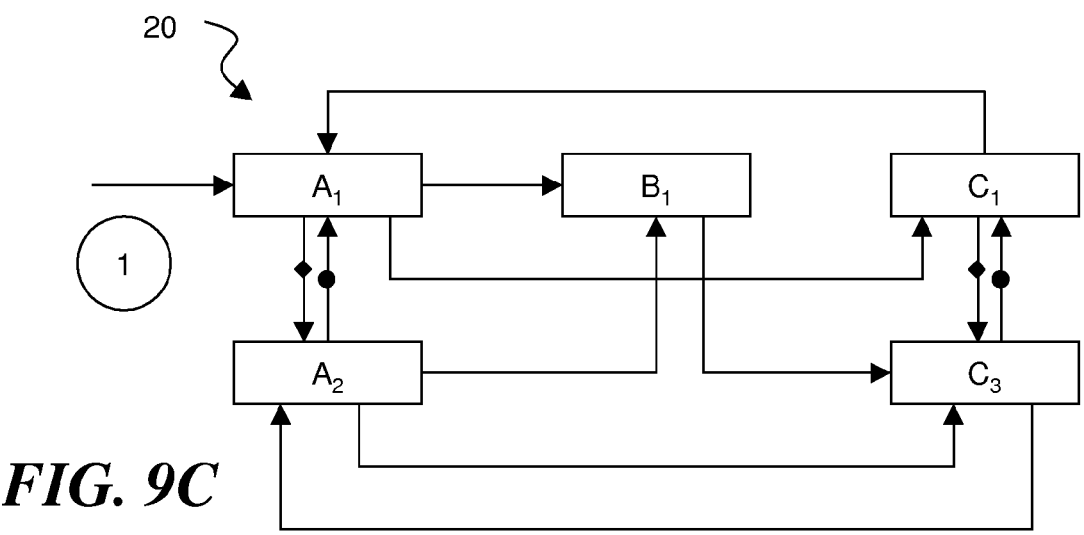

As shown in FIG. 9C, the next step is to execute any required memory-barrier instructions (which may be necessary for CPUs with weak memory consistency models) and then begin changing data element link pointers to point to the new data elements and thus complete the linking of the new data elements into the data element group. The first pointer that can be changed is the one emanating from $B_1$ (although the pointers could be updated in any order), so that $B_1$ is now linked to $C_3$. At this point, first generation readers will start encountering $C_3$. However, according to the search method outlined above with reference to FIG. 7, such readers will note the generation number mismatch, and follow the old-version pointer from $C_3$ to $C_1$.

Figure 9D:
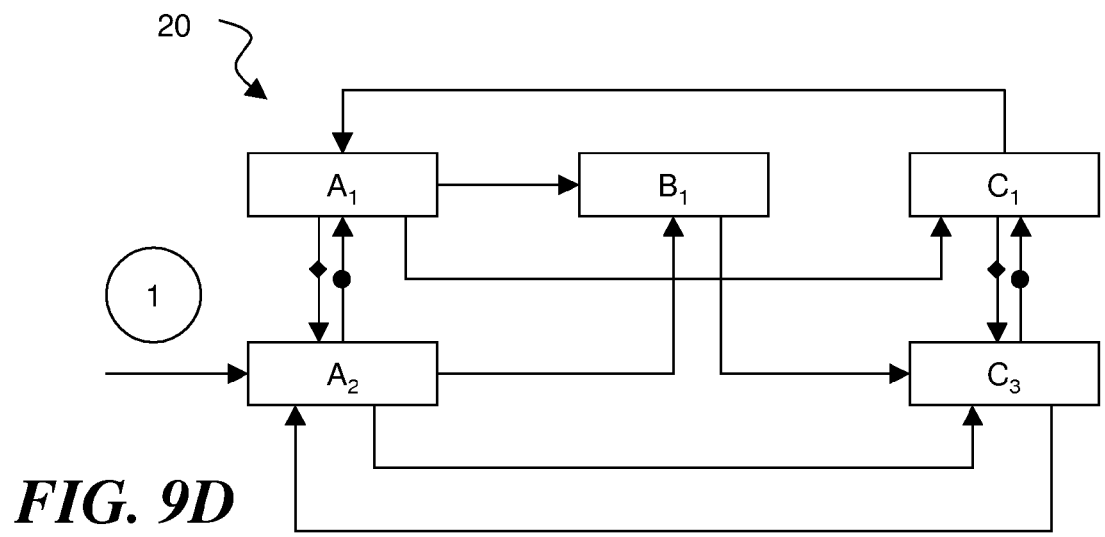

As shown in FIG. 9D, the next pointer to be updated is the graph's global pointer that previously pointed to $A_1$ (see FIG. 9C) and will now point to $A_2$. Once the global pointer is updated, first generation readers will start encountering both $A_2$ and $C_3$, and will follow the old-version pointers upon noting the generation number mismatch.

Figure 9E:
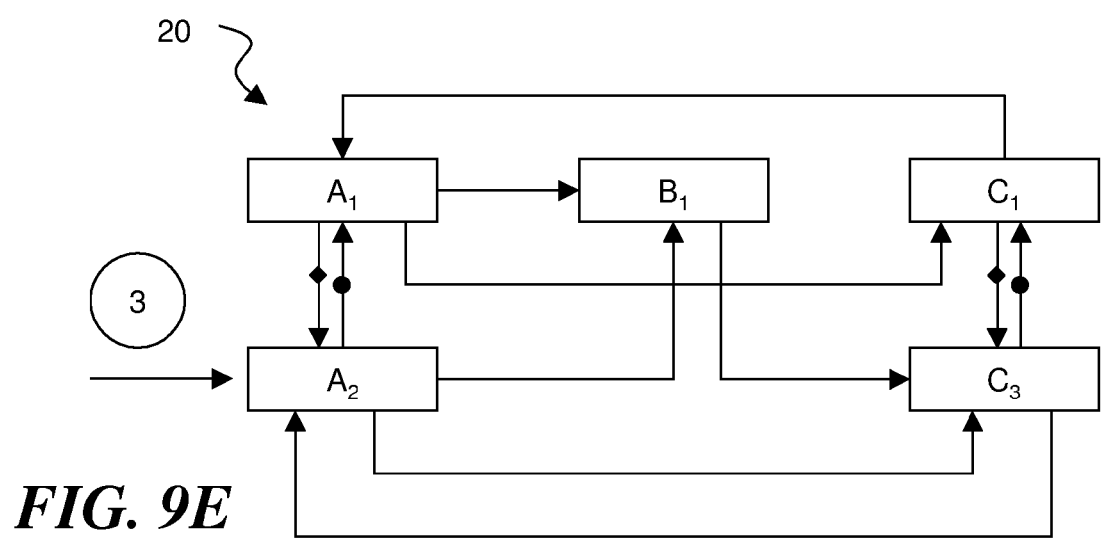

As shown in FIG. 9E, one or more of the updaters completes the update by incrementing the global generation number. If the $A_2$ updater finishes ahead of the $C_3$ updater, the $A_2$ updater will increment the global generation number to 2 and then the $C_3$ updater will increment the global generation number to 3. If the $C_3$ updater finishes ahead of the $A_2$ updater, only the latter will update the global generation number, but will set the number to 3 as is required. As described in connection with step 60 of FIG. 8, the updaters cooperate so that the final global generation number corresponds to the largest new generation number, namely $C_3$'s new generation number of 3. Thus, even though the updater handling $C_3$ finishes before the updater handling $A_2$, the final global generation number will still be 3 rather than 2. An example of how this cooperative updating can be implemented is described in more detail below. Assuming no memory-barrier instructions are used at this point, readers might see the global generation number update and the global pointer update in any order. The old/new-version pointers will direct the readers to the correct data element version in either case. Although the use of memory barriers could allow simplification of the search process in some special cases, the foregoing methodology has the advantage of generality. Note that second generation readers will still find $B_1$, but will accept it as the current version because $B_1$ has no new-version pointer.

Figure 9F:
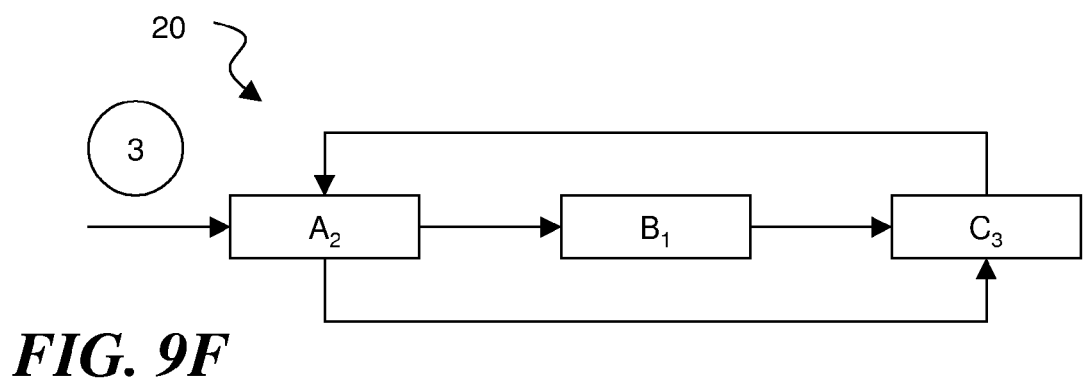

As shown in FIG. 9F, once a grace period has elapsed, old data elements $A_1$ and $C_1$ may be discarded, along with their corresponding link pointers. The old/new-version pointers for all remaining data elements are set to NULL (as necessary).

Figure 10:
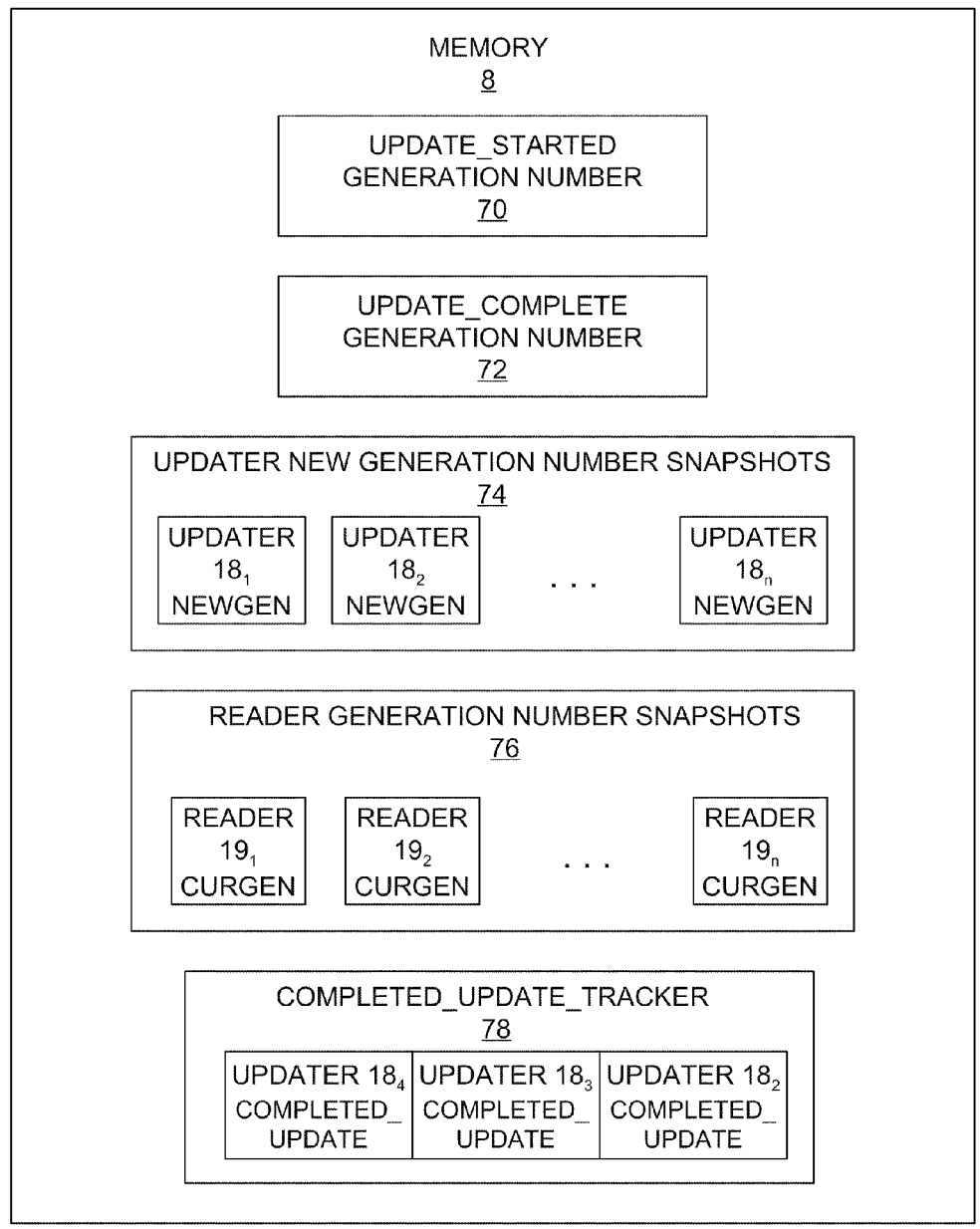
FIG. 10 is a block diagram showing example data variables that may be used to support concurrent updates of a data element group in accordance with the present disclosure.

An example of how the generation number processing of FIGS. 8 and 9A-9F may be performed by concurrent updaters will now be described with reference to the data variables of FIG. 10. FIG. 10 illustrates two global variables 70 and 72 used for updates, one set of local variables 74 also used for updates, one set of local variables 76 used for read operations, and a further global variable 78 used for updates.

The global variable 70 is referred to as the "update_started" generation number. This variable is a global update sequencing number used by updaters to coordinate the assignment of new generation numbers to their new data elements (and to themselves). The update_started generation number 70 is atomically incremented by an updater each time an update operation is started. The global variable 72 is referred to as the "update_complete" generation number. This variable represents the global generation number for a data element group (such as the cyclic graph 20 of FIG. 5), and is atomically modified as updates complete. In particular, assume there is a group of "n" updaters that begin update operations immediately following a previous global generation number update. After all members of the updater group have completed data element update processing, the update_complete generation number 72 will be set equal to the new generation number of the last updater of the group to begin update operations (which will be the current value of the update_started generation number 70). It will be appreciated that the foregoing variables 70 and 72 should be large enough that the generation numbers can be assumed not to wrap, or value comparisons must assume modular arithmetic techniques known to persons skilled in the art.

The local variables 74 referred to as "newgen" represent snapshots that each updater takes of the current value of the update_started generation number 70. Updaters use their respective newgen variables 74 to assign new generation numbers to new data elements, and to coordinate updates of the global generation number (i.e., the update_complete generation number 72). FIG. 10 shows "n" newgen variables 74 respectively stored by updaters $18_1$, $18_2$ ... $18_n$ that are assumed to be performing concurrent updates.

The local variables 76 referred to as "curgen" represent snapshots that each reader takes of the current value of the update_complete generation number 72. Readers use their respective curgen variables 76 to locate the correct versions of data elements in the data groups they read. FIG. 10 shows "n" curgen variables 76 respectively stored by readers $19_1$, $19_2 \ldots 19_n$.

The global variable 78 referred to as the "completed_update_tracker" is a data structure that tracks completed updaters in order to handle out-of-order completion. It stores a set of new generation numbers that may not yet be used to update the global generation number because there are other earlier-commencing updaters still waiting to complete. Only an updater whose new generation number is the only possible next global generation number is authorized to update the update_complete generation number 72. For example, if the current value of the update_complete generation number 72 is 1, only an updater whose new generation number is 2 may update the global generation number. Any updater whose new generation number does not represent the only possible next global generation number must refrain from modifying the update_complete generation number 72. Instead, such an updater atomically places its new generation number in the completed_update_tracker 78. When the update_complete generation number 72 is subsequently updated by a valid updater, the completed_update_tracker 78 is consulted to determine the highest new generation number that can be used to update the update_complete generation number 72. In the example above, the updater whose new generation number is 2 might consult the completed_update_tracker 78 and find that it contains the following sequence of new generation numbers: 3-4-5. In that case, the updater would set the new update_complete generation number 72 equal to 5 (not 2), then delete the new generation numbers 3, 4 and 5 from the completed_update_tracker 78. The completed_update_tracker 78 can be implemented in a variety of ways, including as a dense array that is indexed circularly. The elements of the array could be integers that correspond to the new generation numbers of updaters that have completed out of order. In that case, the size of the array would limit the number of concurrent updates.

Figure 11:
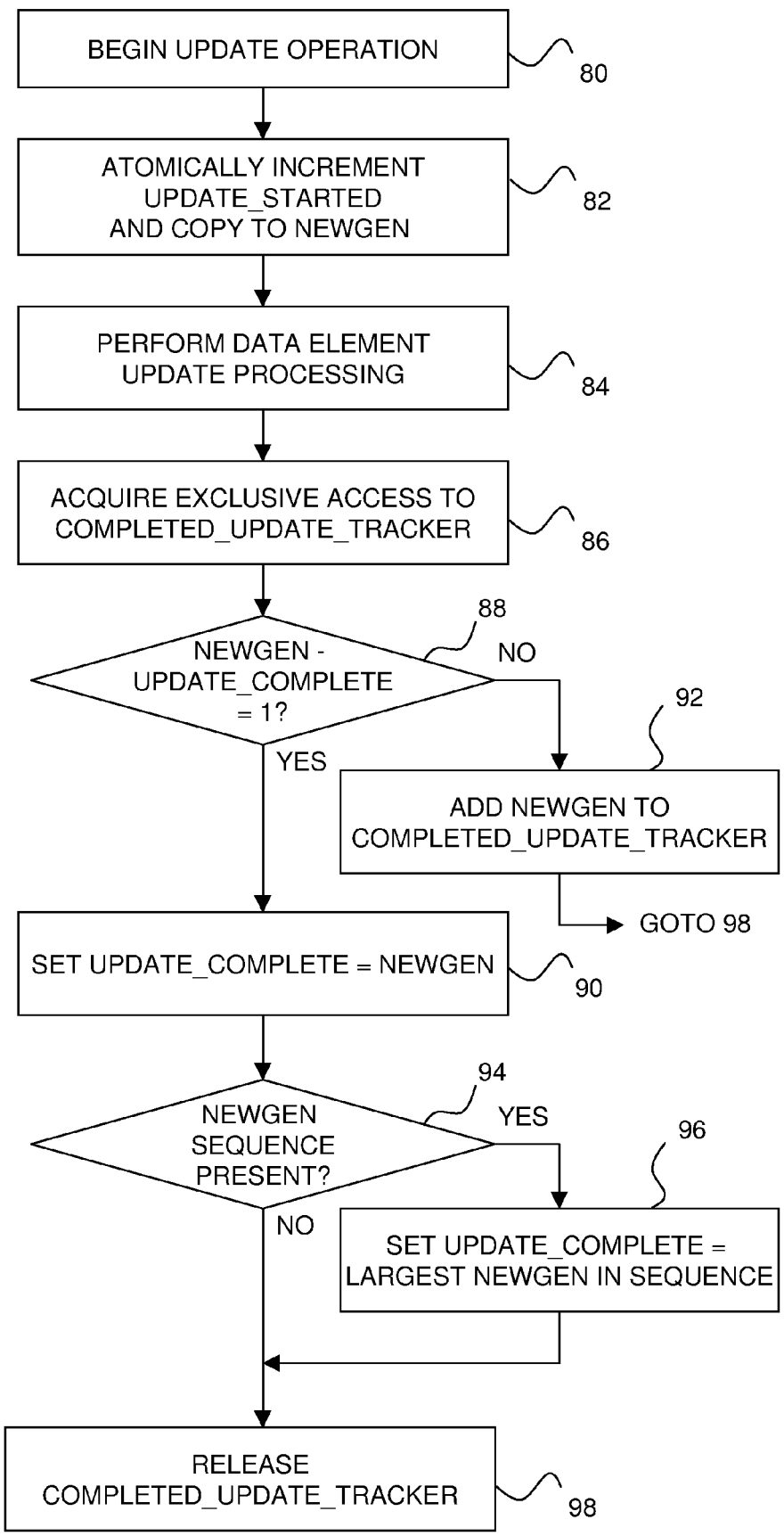
FIG. 11 is a flow diagram illustrating an example implementation of the method of FIG. 8 using data variables shown in FIG. 10.

FIG. 11 illustrates an example of how an individual updater may perform update processing using the variables 70-74 and 78 described above. The disclosed method requires that the updater use a suitable mutual exclusion mechanism when accessing the global variables 70, 72 and 78, such as locking or wait-free synchronization. In step 80, the updater begins an update operation by creating one or more new data group elements per step 52 of FIG. 8. In step 82, the updater determines its new generation number by atomically incrementing the update_started generation number 70 and copying the new value to the local newgen variable 74. In step 84, the updater performs data element update processing according to steps 54-58 of FIG. 8. In step 86, the updater acquires exclusive access to the completed_update_tracker 78. This may be handled by acquiring a lock or by using another suitable synchronization mechanism such as non-blocking synchronization, transactional memory, etc. In step 88, the updater checks the update_complete generation number 72 to see if its value is one less than the updater's newgen variable 74. If true, the updater assigns newgen to the update-complete generation number 72 in step 90. Otherwise, the updater adds newgen to the completed_update_tracker 78 in step 92. If step 90 is reached, the updater implements step 94 by testing whether the completed_update_tracker 78 contains a sequence of new generation numbers beginning one greater than the current value of the update_complete generation number 72. If true, the updater implements step 96 by assigning the largest value of this sequence to the update_complete generation number 72 to serve as the global generation number, then removes the sequence from the completed_update_tracker 78. Following step 96, step 92, or a false result in step 94, the updater releases the completed_update_tracker 78 in step 98. Note that steps 88 and 90 could be eliminated if desired. In that case, each updater would automatically add its newgen value to the completed_update_tracker 78 per step 92, then test in step 94 for the required newgen sequence. The updater whose newgen value is one greater than the current update_complete generation number 72 will be the updater that executes step 96. Alternatively, updating of the update_complete generation could be deferred until a threshold newgen sequence has accumulated (e.g. a sequence of "n" consecutive newgen values beginning one higher than the current update_complete generation number).

The following example illustrates how the update processing of FIG. 11 maintains the update_complete generation number 72 in a valid state. Assume initially that update_started=0, update_complete=0 and completed_update_tracker is empty [ ]. Further assume that eight updaters $18_1$, $18_2$, $18_3$, $18_4$, $18_5$, $18_6$, $18_7$ and $18_8$ begin update operations at approximately the same time, and they all respectively implement step 82 of FIG. 11 before any of them reach step 86. The update_started generation number 70 will thus be incremented from its initial 0 value as follows:

$18_1$---->atomic update_started++ (update_started=1)
$18_2$---->atomic update_started++ (update_started=2)
$18_3$---->atomic update_started++ (update_started=3)
$18_4$---->atomic update_started++ (update_started=4)
$18_5$---->atomic update_started++ (update_started=5)
$18_6$---->atomic update_started++ (update_started=6)
$18_7$---->atomic update_started++ (update_started=7)
$18_8$---->atomic update_started++ (update_started=8)

The newgen values for the updaters $18_1$, $18_2$, $18_3$, $18_4$, $18_5$, $18_6$, $18_7$ and $18_8$ will be 1, 2, 3, 4, 5, 6, 7 and 8, respectively. The update_complete generation number is still 0.

Now assume that the updaters start implementing steps 86-96 of FIG. 11. If they do this in consecutive order according to when they began update operations and incremented the update_started global generation number 70, then according to steps 88 and 90 of FIG. 11, the update_complete generation number 72 will be incremented in eight successive stages from 0 to 1 to 2 to 3 to 4 to 5 to 6 to 7 to 8. However, if the updaters do not reach steps 86-96 of FIG. 11 in consecutive order, steps 88 and 92-96 comes into play to handle the out-of-order processing. For example, assume that the updaters reach step 86 in the following order: $18_8$, $18_7$, $18_6$, $18_2$, $18_3$, $18_4$, $18_1$ and $18_5$. If the updaters simply assigned their newgen value to the update_complete generation number 72, the global generation number would not accurately reflect the eight updaters. The last updater $18_5$ would set the update_complete generation number 72 to 5. This would be incorrect because the global generation number should actually be 8. Steps 88 and 92-96 handle this situation gracefully, as follows (again assuming the updaters reach step 86 of FIG. 11 in order of: $18_8$, $18_7$, $18_6$, $18_2$, $18_3$, $18_4$, $18_1$ and $18_5$):

Updater $18_8$ finds that its newgen of 8 is more than 1 greater than update_complete in step 88, so it adds its newgen to the update_tracker array in step 92 so that the latter is now [8], then releases the completed_update_tracker per step 98;

Updater $18_7$ finds that its newgen of 7 is more than 1 greater than update_complete in step 88, so it adds its newgen to the update_tracker array in step 92 so that the latter is now [8, 7], then releases the completed_update_tracker per step 98;

Updater $18_6$ finds that its newgen of 6 is more than 1 greater than update_complete in step 88, so it adds its newgen to the update_tracker array in step 92 so that the latter is now [8, 7, 6], then releases the completed_update_tracker per step 98;

Updater 18$_2$ finds that its newgen of 2 is more than 1 greater than update_complete in step 88, so it adds its newgen to the update_tracker array in step 92 so that the latter is now [8, 7, 6, 2], then releases the completed_update_tracker per step 98;

Updater 18$_3$ finds that its newgen of 3 is more than 1 greater than update_complete in step 88, so it adds its newgen to the update_tracker array in step 92 so that the latter is now [8, 7, 6, 3, 2], then releases the completed_update_tracker per step 98;

Updater 18$_4$ finds that its newgen of 4 is more than 1 greater than update_complete in step 88, so it adds its newgen to the update_tracker array in step 92 so that the latter is now [8, 7, 6, 4, 3, 2], then releases the completed_update_tracker per step 98;

Updater 18$_1$ finds that its newgen of 1 is 1 greater than update_complete in step 88, so it sets update_complete to 1 per step 90. The updater 18$_1$ then finds that step 94 is satisfied because the completed_update_tracker array contains the newgen sequence 2, 3, 4. The sequence begins with a newgen value (e.g., 2) that is one greater than update_complete. Per step 96, the updater 18$_1$ sets update_complete to the largest newgen in the sequence, namely 4. The updater 18$_1$ removes the sequence 2, 3, 4 from the completed_update_tracker array so that the latter is now [8, 7, 6], then releases the completed_update_tracker per step 98;

Updater 18$_5$ now finds that its newgen of 5 is 1 greater than update_complete in step 88, so it sets update_complete to 5 per step 90. The updater 18$_5$ then finds that step 94 is satisfied because the completed_update_tracker 78 contains the newgen sequence 8, 7, 6. The sequence begins with a newgen value (e.g., 6) that is one greater than update_complete. Per step 96, the updater 18$_5$ sets update_complete to the largest newgen in the sequence, namely 8. The updater 18$_5$ removes the sequence 8, 7, 6 from the completed_update_tracker array so that the latter is now empty [ ], then releases the completed_update_tracker per step 98.

It will be appreciated that various techniques may be used to ensure that updaters see the contents of the completed_update_tracker data structure 78 in the correct order. One technique would be to use a sorted array that is sorted so that the newgen values therein are handled in sequence. Another way would be use a completed_update_tracker data structure that tracks newgen for each updater by position rather than value. For example, a bit mask (e.g., a 64-bit mask) could be used in which the low-order bit represents the sequence number that is one greater than update_complete, the next bit two greater, and so on. This can be thought of as a 64-element array, with each element being a single bit. An updater could register itself into the update_tracker bit mask per step 92 of FIG. 11 by setting the corresponding bit. The newgen sequence check of step 94 of FIG. 11 could then be implemented by way of a binary search of the bit mask using an array of 64 different bit mask templates, as follows:

long mask_array[64]={0x1, 0x3, 0x7, . . . };

A binary search with index "i" (where "i" represents a particular bit mask template at the mask_array[i] index position) could be performed using a bitwise AND operation, as follows:

if ((update_tracker & mask_array[i])=mask_array[i])
    {. . .};

This approach can be used to identify bit sequences represented in the update_tracker bit mask that are mask_array[i] elements long. Step 94 of FIG. 11 could implement an algorithm that starts from the lowest order bit in the update_tracker bit mask and continues until the largest consecutive bit sequence is found. For example, if the 8 lowest order bits of the update_tracker bit mask were [1 1 1 0 0 1 1 1], mask_array [2]=111 would be the largest matching bit mask template because it would match the three lowest-order bits. By virtue of the way the update_tracker bit mask was defined, this matching bit sequence begins with an index value that is one greater than the current global generation number, and may thus be used to update that number. The global generation number would be incremented by 3 (the number of bits in the sequence). The update_tracker bit mask will be shifted down following a successful comparison by the number of bits in the mask_array[i] that resulted in the match. In the example above, the eight lowest order bits of the update_tracker array would become [x x x 1 1 1 0 0], where x represents the values occupied by the three bits to the left of the eight lowest order bits prior to the shift.

The use of a 64 bit array as the update_tracker variable 78 places an upper limit of 64 concurrent updates. In the (perhaps unlikely) event that 64 concurrent updates is too few, then yet another approach would be to use an array of characters, but still treating each entry (i.e., each bit of the 8 bit character) the same as each bit in the bit mask in the example above. Step 94 of FIG. 11 might then be implemented to look for consecutive character sequences in the update_tracker character array as follows:

```
i = 0;
/* Scan past a consecutive sequence in the update_tracker. */
    while (update_tracker[i++])
        continue;
/* Set update_complete to the current index value of the
sequence. */
    update_complete += i;
/* Delete the update_tracker elements that were part of the
sequence. */
    for (j = 0; i < sizeof(update_tracker) /
sizeof(update_tracker[0]); i++, j++)
        update_tracker[j] = update_tracker[i];
/* Zero out the new elements. */
    for (; j < sizeof(update_tracker) /
sizeof(update_tracker[0]); j++)
        update_tracker[j] = 0;
```

Again, the number of concurrent updates would be limited by the size of the character array.

If there are several independent groups of data elements using the technique described herein, they may keep separate pairs of update_started and update_complete global generation numbers 70 and 72, and separate completed_update_tracker data structures 78. They may also share a single global generation number. Whether shared or not, appropriate mutual exclusion should be used when manipulating these variables. It should also be noted that only a very small amount of global state is required to synchronize an arbitrarily large number of data elements, namely, the global variables 70, 72 and 78. Some implementations (e.g., those for which the completed_update tracker 78 is a small bitmask) should be able to take advantage of small-object non-blocking synchronization algorithms, or, alternatively, of either hardware or software transactional memory.

It will be seen from the foregoing discussion that the global generation number associated with a group of data elements subject to concurrent updates can be updated in coordinated fashion without regard to the order in which the updaters complete their data element update processing. Using the techniques described herein, the global generation number will be updated so that, when all of the updaters have completed their data element update processing, the global generation number will correspond to the new generation number that is associated with the last of the updaters to begin update operations. Advantageously, the updating of the global generation number takes into account the updaters completing their data element update processing in a different order than the updaters began update operations. Using appropriate processing (FIG. 11 being but one example), the updating of the global generation number can be performed in one or more stages as groups of one or more of the updaters complete their data element update processing. Each global generation number update stage produces a global generation number that corresponds to one of the new generation numbers that is the last of a consecutive sequence of one or more new generation numbers associated with updaters that have completed their data element update processing, and wherein the first element of the sequence represents the only possible next global generation number.

Figure 12:
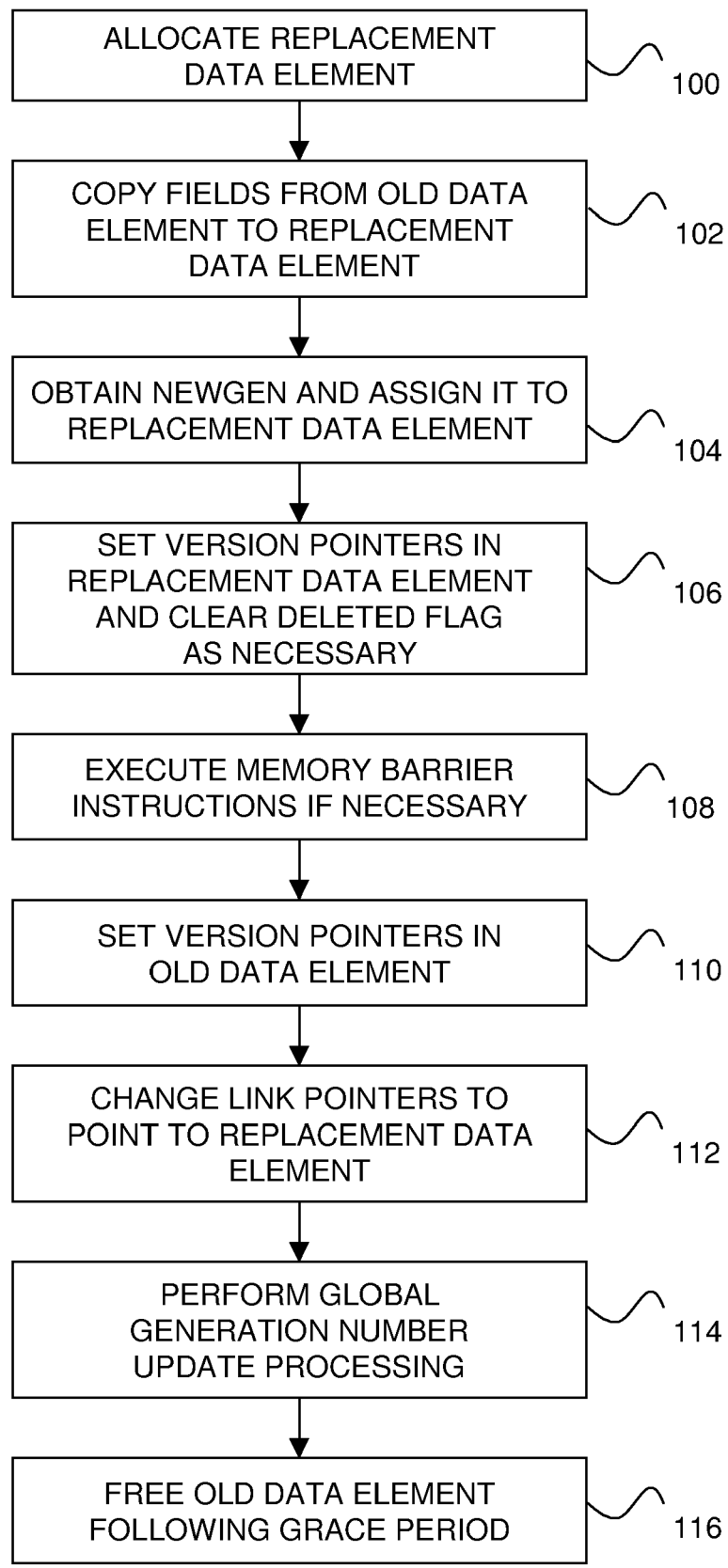
FIG. 12 is a flow diagram showing an example method for replacing a group data element in accordance with the present disclosure.

Based on the foregoing, it is now possible to describe more detailed set of example methods that may be used for different types of data updates and for searches of a cyclic data group. FIG. 12, for example, is a flow diagram illustrating the update logic that may be used by to replace (modify) a data element in accordance with the present disclosure. Plural updaters (such as two or more of the updaters $18_1, 18_2, 18_3 \ldots 18_4$ of FIG. 4) are assumed to begin substantially concurrent updates to plural data elements (with each updater updating one or more data elements). Initially, each updater will implement some form of mutual exclusion to ensure data integrity during its update operation, such as locking or wait-free synchronization. Then the updaters respectively implement steps 100, 102, and 104 for each data element being replaced. In particular, each updater allocates a replacement data element, copies the corresponding fields from the old data element to the new version, then obtains newgen (according to the technique describe herein) and assigns it to the latter's generation-number field. In step 106, the updaters set the old-version pointer in the replacement data element to point to the old data element, and set the new-version pointer in the replacement data element to NULL. If the new data element has a "deleted" flag set (see below), this flag is cleared. In step 108, the updaters execute appropriate memory-barrier instructions if required by the underlying computer hardware. In step 110, the new-version pointer of the old data element is set to reference the replacement data element. In step 112, the updaters change all link pointers that point to the old data element to instead point to the replacement data element. Any searches performed at this point will arrive at the replacement data element, but will move to the old data element due to the fact that the global generation number has not yet been updated. In step 114, the updaters perform global generation number update processing according to the technique described herein. In step 116, the updaters cause the old data element to be freed after a grace period elapses. This can be done using the callback registration method of U.S. Pat. No. 5,727,209, referred to by way of background above, or by any other suitable means.

Figure 13A:
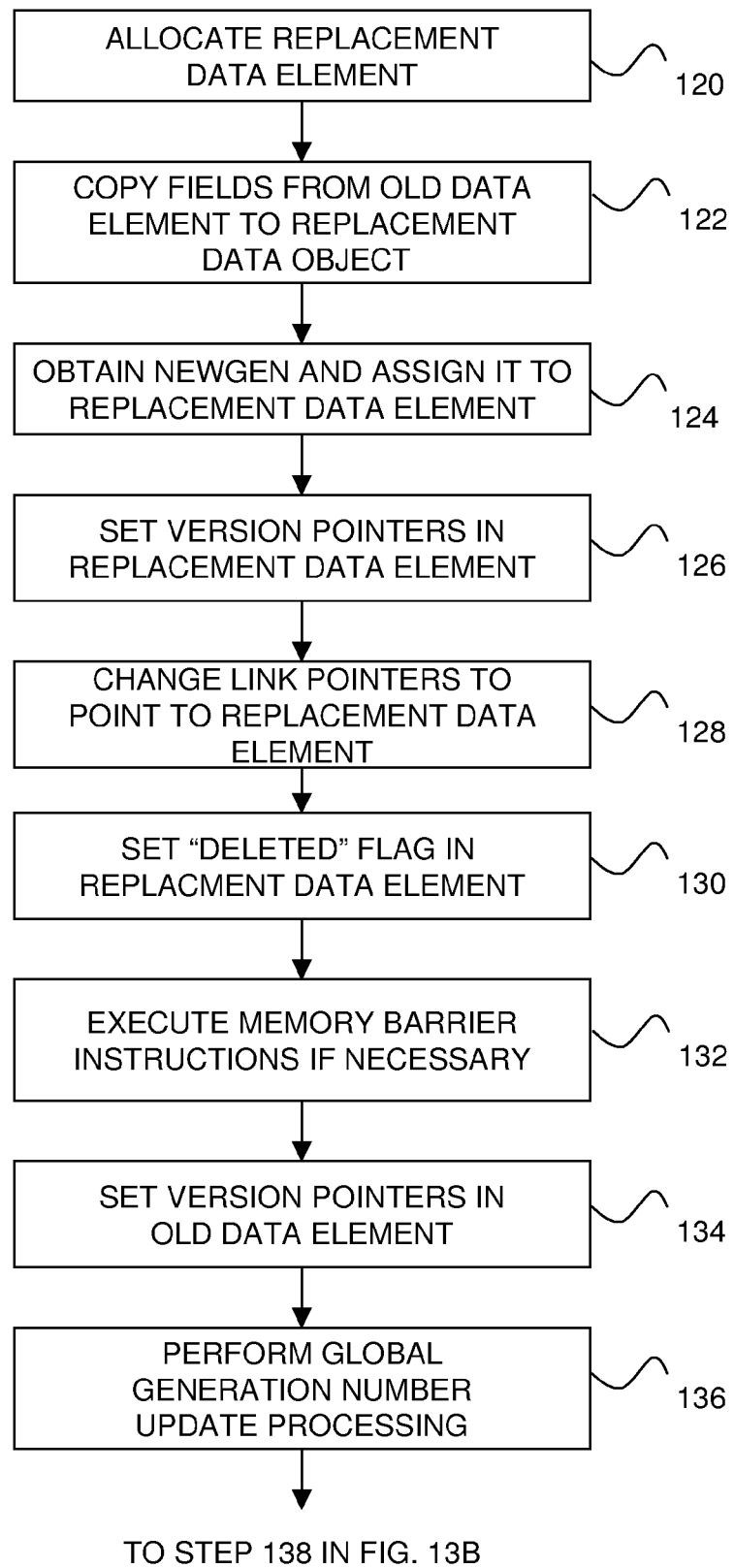
FIGS. 13A and 13B collectively represent a flow diagram showing an example method for deleting a group data element in accordance with the present disclosure.
Figure 13B:
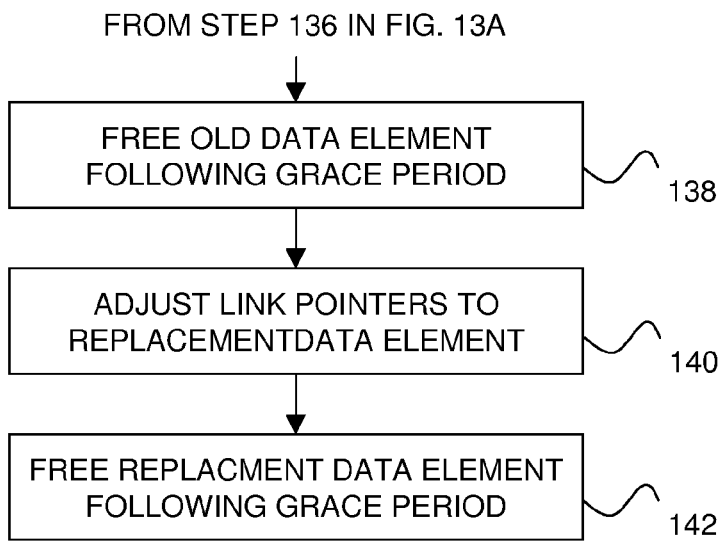

FIGS. 13A and 14B collectively represent a flow diagram illustrating the update logic that may be used to delete a data element in accordance with the invention. Deleting a data element in a data element group can be performed by creating a replacement "dummy" data element corresponding to the old data element to be deleted and setting a "deleted" flag in the new version. Actual deletion then proceeds by replacing the old (to-be-deleted) data element with the copy that has the "deleted" flag set. As with the data element replacement method described above, some form of mutual exclusion should be used, such as locking or wait-free synchronization.

Again, plural concurrent updaters (such as two or more of the updaters $18_1, 18_2, 18_3 \ldots 18_n$ of FIG. 4) are assumed to begin substantially concurrent updates to plural data elements (with each updater updating one or more data elements). Initially, each updater will implement some form of mutual exclusion to ensure data integrity during its update operation, such as locking or wait-free synchronization. Then the updater respectively implement steps 120, 122, and 124 for each data element being deleted. In particular, each updater allocates a replacement data element, copies the corresponding fields from the old data element to the new version, then obtains newgen (according to the technique describe herein) and assigns it to the latter's generation-number field. In step 126, the updaters set the old-version pointer in the replacement data element to point to the old data element, and set the new-version pointer in the replacement data element to NULL. In step 128, the updaters change all link pointers that point to the old data element to instead point to the replacement data element. Any searches performed at this point will arrive at the replacement data element, but will move to the old data element due to the fact that the global generation number has not yet been updated. In step 130, the updaters set the "deleted" flag in the replacement data element. In step 132, the updaters execute appropriate memory-barrier instructions if required by the underlying computer hardware. In step 134, the updaters set the new-version pointer of the old data element to reference the replacement data element. In step 136, the updaters perform global generation number update processing according to the technique described herein. In step 138, the updaters cause the old data element to be freed after a grace period elapses. In step 140, the updaters adjust any link pointers referencing the replacement data element (e.g., by setting them to NULL or pointing them to the data element following the replacement data element. In step 142, the updaters cause the replacement data element to be freed after a grace period elapses.

Figure 14:
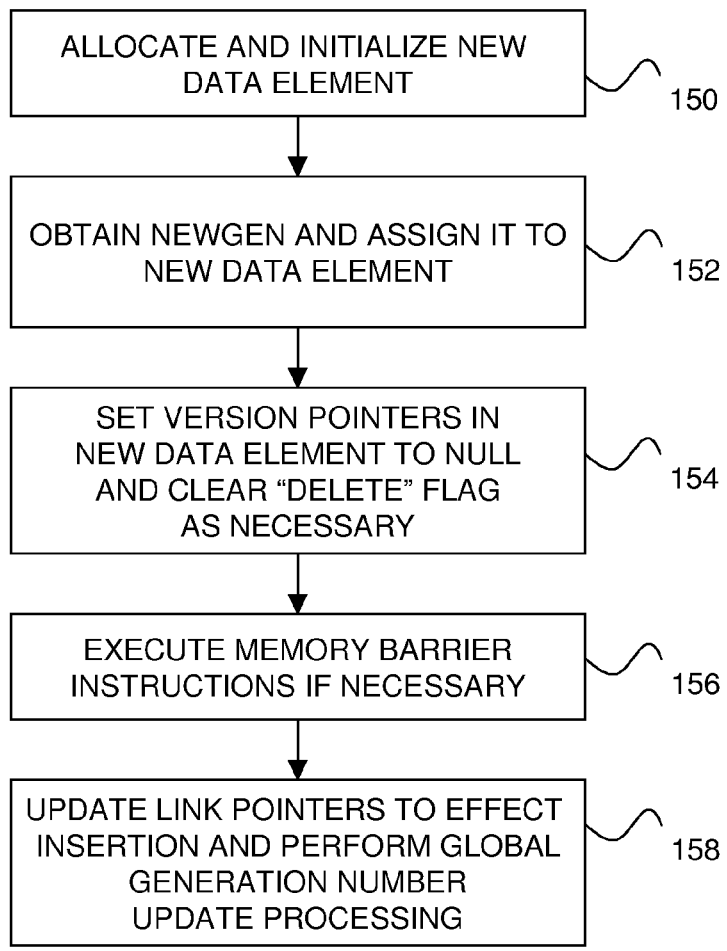
FIG. 14 is a flow diagram showing an example method for inserting a group data element in accordance with the present disclosure.

Another way in which a data element group can be updated is by way of insertion of a new data element. There are a number of ways to handle insertion, depending on the situation. In all cases, some form of mutual exclusion should be used, such as locking or wait-free synchronization. FIG. 14 is a flow diagram illustrating the update logic that may be used to insert a data element in accordance with the invention when the data element group is searched using keys. For this type of search, when the reader finds a data element corresponding to something that does not yet exist (from the reader's perspective), it will simply act as if the search key did not match. Again, plural concurrent updaters (such as two or more of the updaters $18_1, 18_2, 18_3 \ldots 18_n$ of FIG. 4) are assumed to begin substantially concurrent updates to plural data elements (with each updater updating one or more data elements). Then the updaters respectively implement steps 150 and 152. In particular, each updater allocates and initializes a new data element, including all of its pointers, then obtains newgen (according to the technique describe herein) and assigns it to the latter's generation-number field. In step 154, the updaters set both the old-version and new-version pointers in the new data element to NULL. If the new data element has a "deleted" flag set, this flag is cleared. In step 156, the updaters execute appropriate memory-barrier instructions if required by the underlying computer hardware. In step 158, the link pointers needed to insert the new data element in the group are updated, and the updaters perform global generation number update processing according to the technique described herein. Following a grace period, all readers will see the newly inserted data element.

Another way to perform insertions is to only insert new data elements at NULL link pointers. The method shown in FIG. 14 works in this case, but a current generation reader must act as though a NULL pointer was encountered rather than just skipping when a new data element without an old version is encountered (see below).

Figure 15:
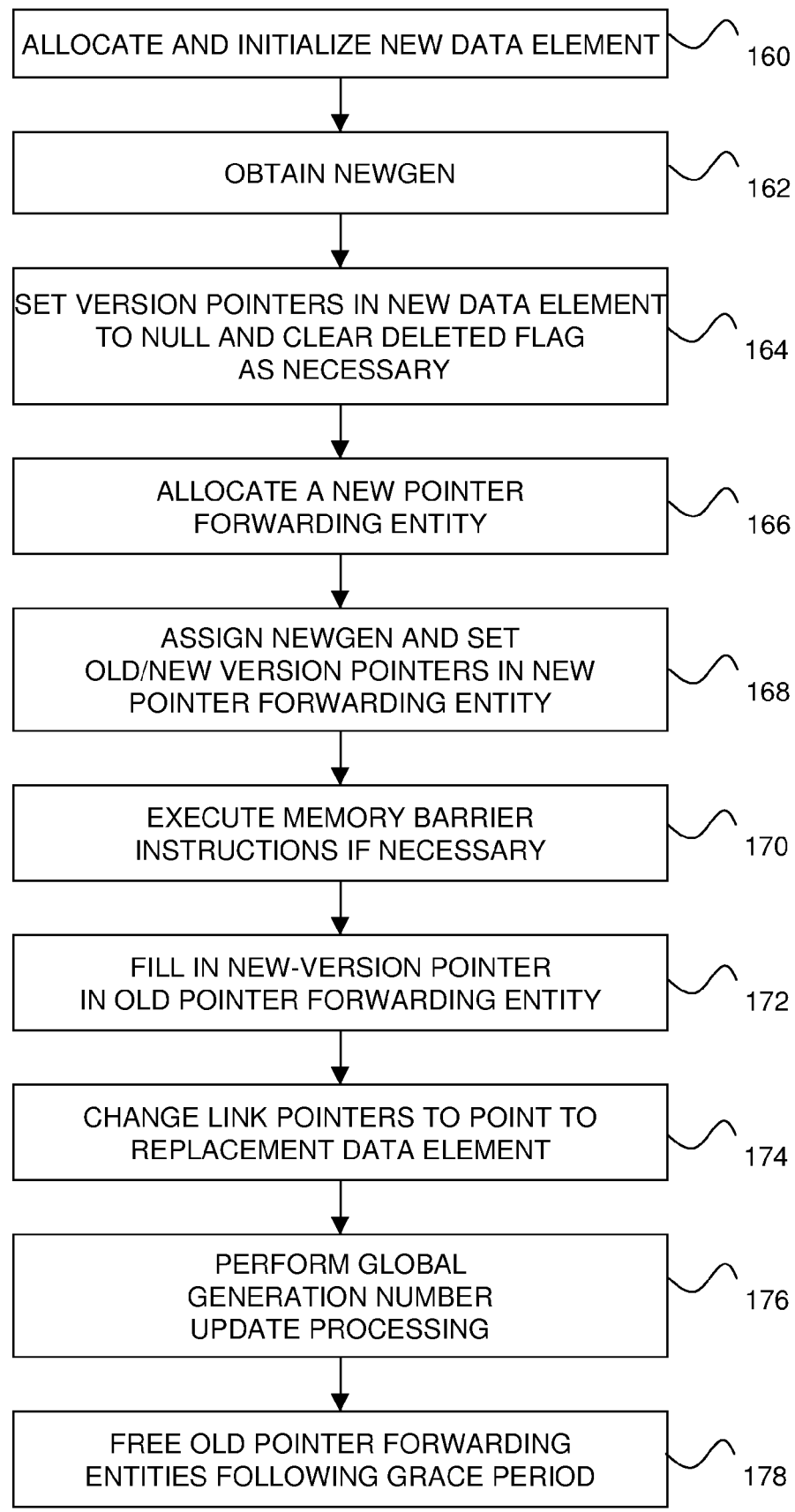
FIG. 15 is a flow diagram showing an example method for performing data element updates using pointer forwarding entities in accordance with the present disclosure.

FIG. 15 illustrates how updates can be performed using pointer-forwarding entities. Again, plural concurrent updaters (such as two or more of the updaters $18_1, 18_2, 18_3 \ldots 18_n$ of FIG. 4) are assumed to begin substantially concurrent updates to plural data elements (with each updater updating one or more data elements). Then the updaters respectively implement steps 160 and 162. In particular, the each updater allocates and initializes a new data element, then obtains newgen (according to the technique describe herein). In step 164, the updater sets both the old and new version pointers in the new data element to NULL. If the new data element has a "deleted" flag set (see below), this flag is cleared. All pointer-forwarding entities that now need to point to the new data element are replaced in the following manner. In step 166, the updaters allocate a replacement pointer-forwarding entity. In step 168, the updaters assign newgen to the new pointer forwarding entity's generation-number field, set the old-version pointer to point to the old pointer-forwarding entity, and set the new-version pointer to NULL.

In step 170, the updaters execute appropriate memory-barrier instructions if required by the underlying computer hardware. In step 172, the updaters fills in the new-version pointer in the old pointer forwarding entity to point to the new pointer forwarding entity. In step 174, the updaters change all link pointers that point to the old pointer forwarding entity to instead point to the new pointer forwarding entity. Any searches performed at this point will arrive at the new pointer forwarding entity, but will move to the old pointer forwarding entity due to the fact that the global generation number has not yet been updated. In step 176, the updaters perform global generation number update processing according to the technique described herein. In step 178, the updaters cause the old pointer forwarding entities to be freed after a grace period elapses.

Turning now to FIGS. 16A-16E, the use of pointer forwarding entities is presented in the context of a circular linked list 180. The linked list 180 comprises three data elements A, B and C in that order. There is also a global list head pointer forwarding entity P(h) that points to data element A, and three additional pointer forwarding entities P(A), P(B) and P(C) respectively pointing from data elements A, B and C to data elements B, C and A. It is assumed that data elements A and B are to be interchanged in the list 180. Although this operation would typically be implemented by only one updater, its description will aid in the understanding of point forwarding entities, allowing them to be used when plural concurrent updaters are present. One way to interchange data elements A and B would be to allocate new copies of A, B, and C, then update their pointers and version number, proceeding as one would for a normal atomic replacement of these three elements. However, it is sometimes desirable to switch the two elements without creating new copies. Pointer-forwarding entities allow an updater to accomplish the goal, and the present example thus illustrates a further benefit of the pointer-forwarding approach.

Figure 16A:
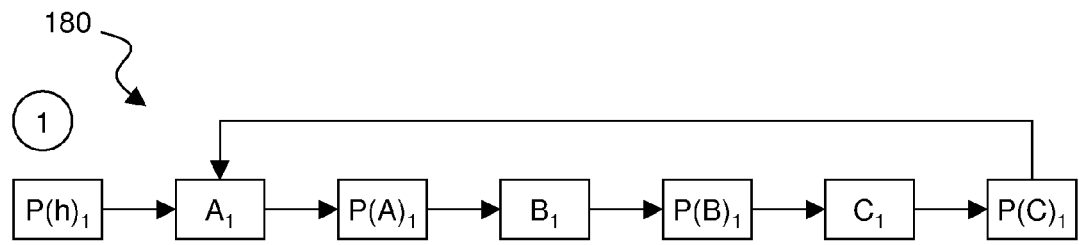
FIGS. 16A-16E are diagrammatic representations of a group of data elements implemented as a circular list during various stages of an update operation in which elements A and C are interchanged using pointer forwarding entities in accordance with another example of the disclosed technique.
Figure 16B:
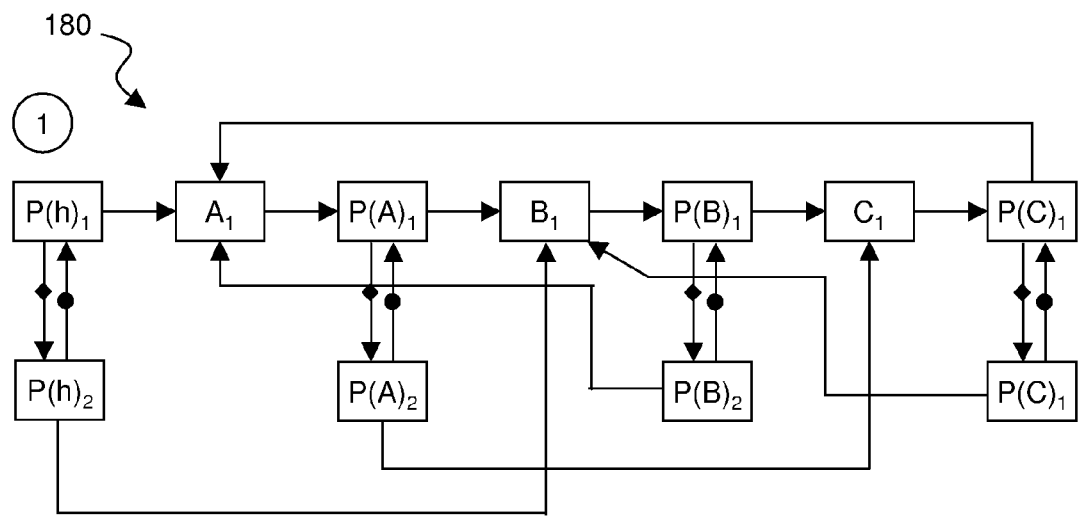

FIG. 16A shows the initial state of the list 180, with the subscripts representing generation numbers, and the circled number on the left-hand side of the figure representing the global generation number. To exchange data elements A and B, the generalized method of FIG. 15 can be used. Note, however, that steps 160-164 directed to the creation of new data elements are not required because A and B are simply going to be interchanged rather than updated. As shown in FIG. 16B, the first step in the interchange process is to create a new set of pointer-forwarding entities that arrange the list in the new order of B, A, C. Note that readers will not encounter the new pointer-forwarding entities because the old pointer-forwarding entities still match the global generation number.

Figure 16C:
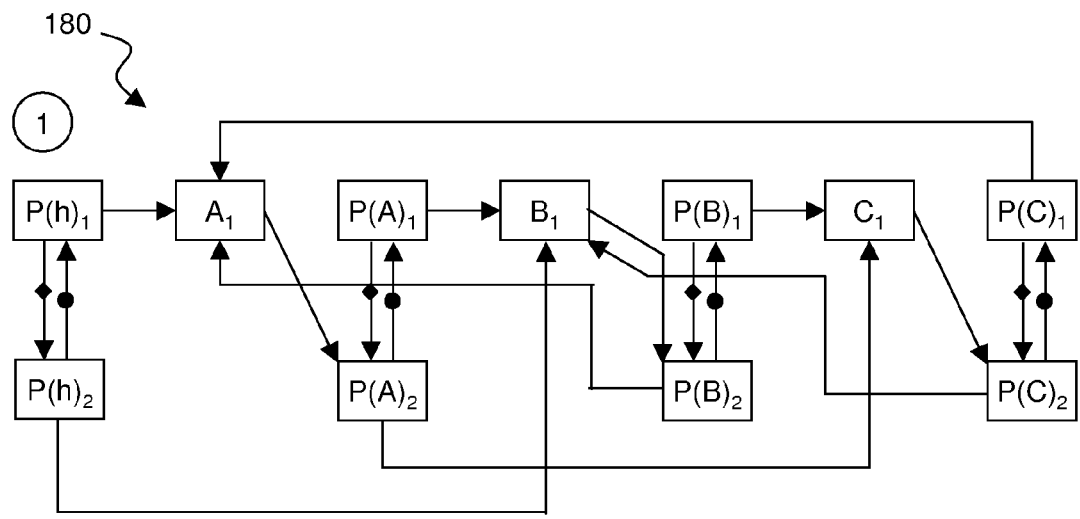

At this point, appropriate memory barrier instructions are executed if required by the hardware to commit the contents of the new pointer-forwarding entities to memory. As shown in FIG. 16C, all link pointers from the data elements A, B and C may now be updated to point to the new versions of the pointer-forwarding entities. Readers will thus encounter the new pointer-forwarding entities. Note, however, that first generation readers will still follow the old-version pointers back to the old pointer-forwarding entities due to version-number mismatch.

Figure 16D:
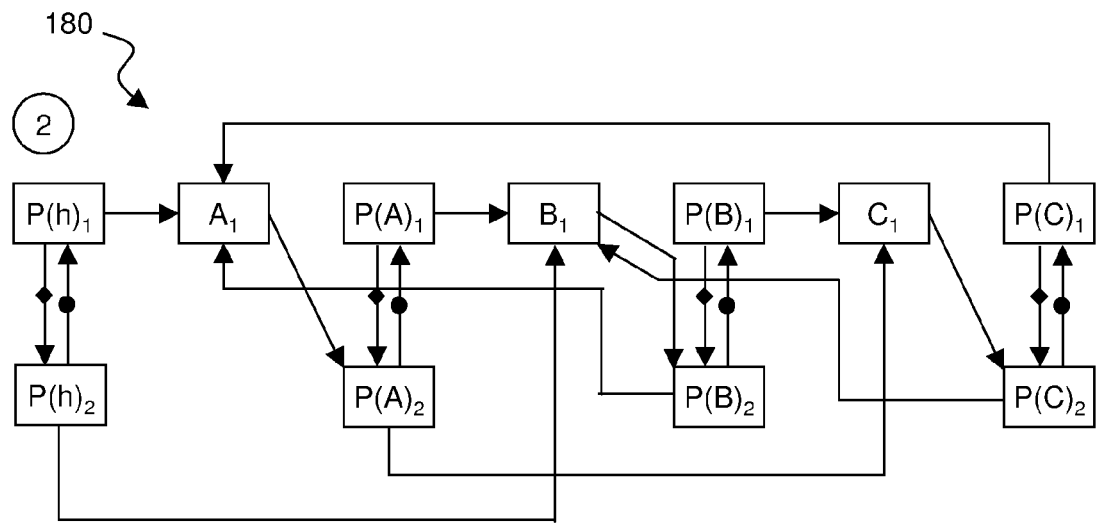

As shown in FIG. 16D, the global generation number is updated. Assuming no memory barrier instructions are executed at this point, readers may see the pointer and global generation number updates in any order. However, readers will follow the old/new version pointers in the pointer-forwarding entities as needed based on the global generation number snapshot assigned to the search (curgen).

Figure 16E:
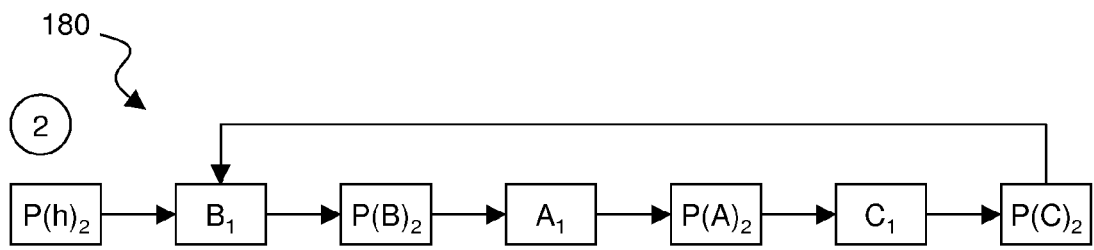

As shown in FIG. 16E, after a grace period elapses, the old pointer-forwarding entities may be freed and the old-version and new-version pointers are NULLed.

Searching data groups that have been updated by concurrent updaters according to the technique described herein may be performed using the generalized prior art search method set forth in FIG. 7. As previously stated, this search method is disclosed in the '030 publication referred to above in the section entitled "Background of the Invention." In particular, the prior art search method of FIG. 7 corresponds to the search method disclosed in FIG. 7 of the '030 publication. As also stated, the '030 publication discloses additional search details in FIGS. 12A-12C. As disclosed in FIG. 7 herein, readers must determine the current global generation number and assign it to the search. If the variables of FIG. 10 are in use, a reader could snapshot the current value of the update_complete generation number 72 and store it in the curgen local variable 76. One aspect of such searching is that readers may be required to implement memory barriers after acquiring curgen (in case the global generation number on which curgen is based was incremented out of order before the corresponding data element updates have completed). One situation where a reader can omit such memory barriers is if the reader has done a prior search since the last update, such that the global generation number has not changed.

Figure 17:
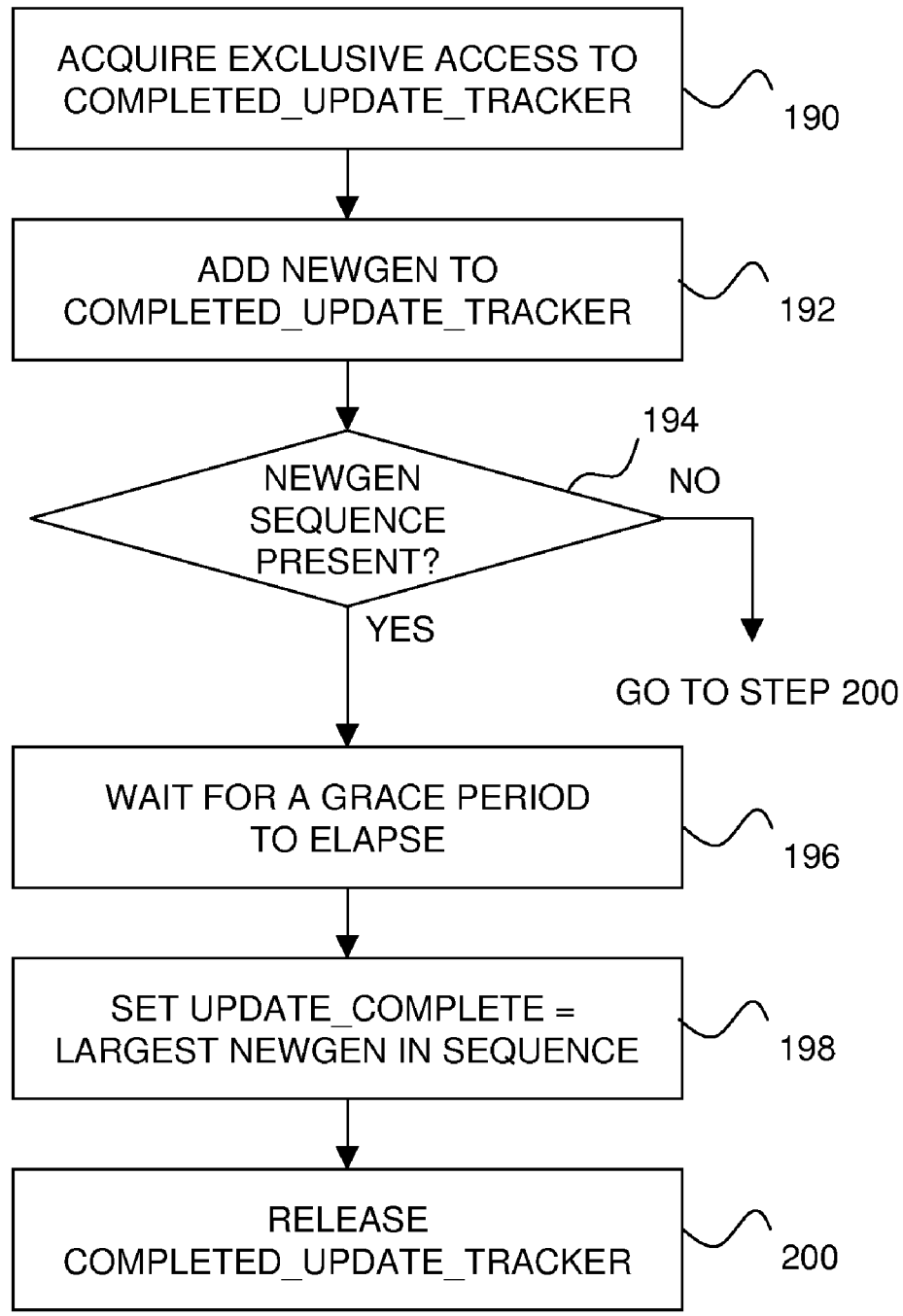
FIG. 17 is a flow diagram showing a first modification to the processing of FIG. 11.

An alternative technique may be employed on the updater side that also allows readers to omit the aforementioned memory barriers. This technique forces updaters to wait for a grace period to elapse before modifying the update_complete generation number 72. This will ensure that all updates that triggered the global generation number incrementation have completed and the global generation number is therefore safe to use as the curgen value. FIG. 17 illustrates a first example version of the technique. It begins in step 190, which corresponds to step 86 of FIG. 11 wherein an updater uses an appropriate technique to acquire exclusive access to the completed_update_tracker data structure 78 (see FIG. 10). In step 192, the updater adds its newgen to the completed_update_tracker (by value or position), then tests in step 194 whether the completed_update_tracker contains a sequence of one or more newgen values beginning one greater than the value of the update_complete generation number. If the sequence is present, the updater waits for a grace period to elapse in step 196 (thereby obviating the need for reader memory barriers). Following a grace period, the updater implements step 198 by setting update_complete equal to the largest newgen in the sequence, then clearing the sequence from the completed_update_tracker. Following step 198, or if a newgen sequence is not found in step 194, the updater releases the completed_update_tracker in step 200.

Note that the foregoing approach requires that the synchronization scheme for the completed_update_tracker permit blocking. In addition, the fact that a grace period must elapse while the completed_update_tracker is being exclusively accessed by a single updater limits the update rate. On way that this situation could be alleviated would be to aggregate some number of sequential newgen values in the completed_update_tracker. Thus, the algorithm could be modified to allow a newgen sequence of some specified length to accumulate before an updater is allowed to perform the grace period processing and update the global generation number.

Figure 18:
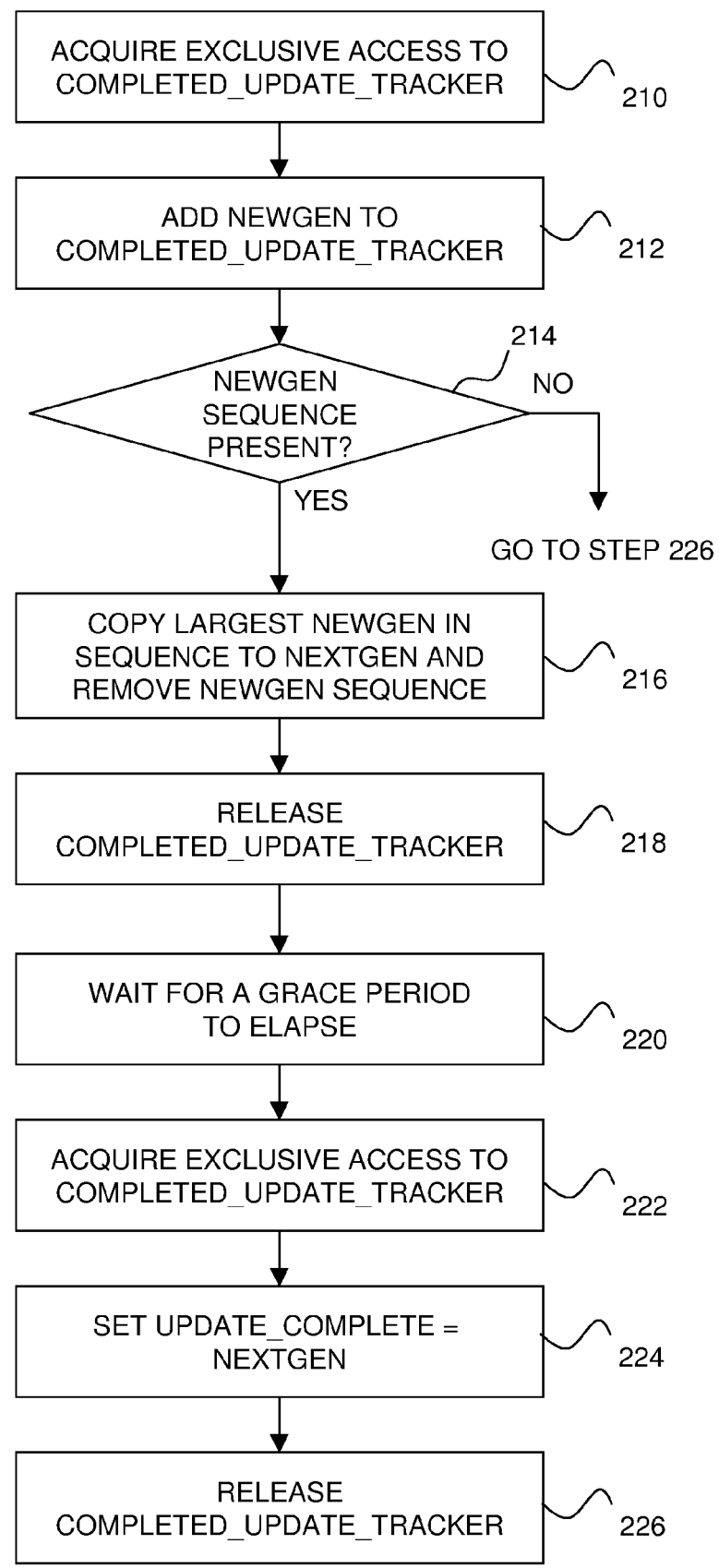
FIG. 18 is a flow diagram showing a second modification to the processing of FIG. 11.

FIG. 18 illustrates an alternative technique that also avoids the above-described issue. FIG. 18 begins in step 210, which corresponds to step 86 of FIG. 11 wherein an updater uses an appropriate technique to acquire exclusive access to the completed_update_tracker data structure 78 (see FIG. 10). In step 212, the updater adds its newgen to the completed_update_tracker, then tests in step 214 whether the completed_update_tracker contains a sequence of one or more newgen values beginning one greater than the value of the update_complete generation number. If the newgen sequence is present, the updater in step 216 copies the largest newgen in the sequence to a local variable, which may be referred to as "nextgen," then removes the newgen sequence from the completed_update_tracker. The updater releases the completed_update_tracker in step 218. At this point, no subsequent updater will enter this code because there cannot possibly be a consecutive sequence of newgen values beginning with one greater than the value of the update-complete generation number until the current updater finishes its update. In step 220, the updater waits for a grace period to elapse (again, obviating the need for reader memory barriers). Following a grace period, the updater implements step 222 by again acquiring exclusive access to the comleted_update_tracker. In step 224, the updater sets update_complete equal to the nextgen. Following step 224, or if a newgen sequence is not found in step 214, the updater releases the completed_update_tracker in step 226.

Note that the approach of FIG. 18 will delay visibility of updates for a grace period, but will permit a large number of updates to proceed in parallel, limited only by the capacity of the completed_update_tracker. Updaters must of course examine the most recent version of the data element group being updated (e.g., the graph 20 of FIG. 5) when they are searching for data elements to update (and are therefore behaving as readers). Thus, updaters should always execute memory barriers when searching the data element group, namely, after referencing the current update_started generation number 70 (to calculate its newgen value 74) and before traversing the data element group. This is because when an updater is searching for a data element to update, it must use a version number equal to the update_started generation number it saw before doing its increment (i.e., newgen −1). Without a memory barrier, the updater would be vulnerable to out of order execution of a data element update operation by another updater before that updater increments the update_started generation number. The updater must also unconditionally execute memory barriers after acquiring curgen during searching.

Figure 19:
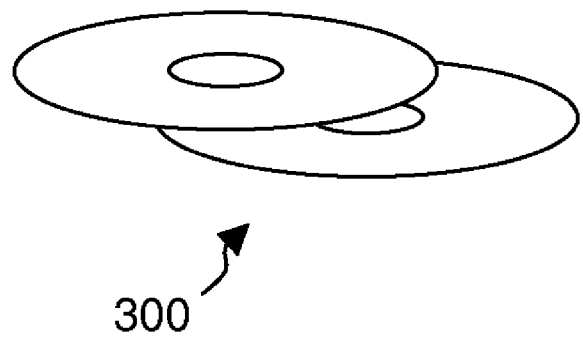
FIG. 19 is a diagrammatic illustration showing media that may be used to provide a computer program product for implementing the technique disclosed herein.

While various embodiments of the invention have been described, it should be apparent that many variations and alternative embodiments could be implemented in accordance with the invention. For example, it will be appreciated that the foregoing concepts may be variously embodied in any of a data processing system, a machine implemented method, and a computer program product in which programming logic is provided by one or more machine-useable media for use in controlling a data processing system to perform the required functions. Exemplary machine-useable media for providing such programming logic are shown by reference numeral 300 in FIG. 19. The media 300 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality, such as an operating system. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium (such as a network), or other entity that can contain, store, communicate, propagate or transport the programming logic for use by or in connection with a data processing system, computer or other instruction execution system, apparatus or device.

It is understood, therefore, that the invention is not to be in any way limited except in accordance with the spirit of the appended claims and their equivalents.

What is claimed is:

1. A method for supporting concurrent updates to a shared data element group while preserving group integrity on behalf of one or more readers that are concurrently referencing group data elements without using locks or atomic instructions, comprising:

invoking two or more concurrent updaters to generate new group data elements;

assigning each new data element created by the same updater a new generation number that is different than a global generation number associated with said data element group and which allows a reader of said data element group to determine whether said new data element is a correct version for said reader;

said new generation numbers being different for each updater and being assigned according to an order in which said updaters respectively begin update operations;

performing data element update processing by:

respectively establishing a first version link that links each of said new data elements to a prior version thereof having a different generation number;

respectively establishing a second version link that links each of said new data elements from its prior version; and respectively establishing group links that link said new data elements into said data element group so that said new data elements are reachable by readers;

updating said global generation number associated with said data element group so that when all of said updaters have completed said data element update processing, said global generation number will correspond to said new generation number that is associated with the last of said updaters to begin update operations; and respectively freeing said prior version, said first version link and said second version link for each of said new data elements following a grace period.

2. The method of claim 1, wherein said updating of said global generation number takes into account said updaters completing said data element update processing in a different order than said updaters begin update operations.

3. The method of claim 1, wherein said updating of said global generation number is performed in one or more stages as groups of one or more of said updaters complete said data element update processing.

4. The method of claim 3, wherein each global generation number update stage produces a global generation number that corresponds to one of said new generation numbers that is the last of a consecutive sequence of one or more new generation numbers associated with updaters that have completed said data element update processing, and wherein the first element of said sequence represents the only possible next global generation number.

5. The method of claim 1, wherein:
said updaters cooperatively assign themselves said new generation numbers by maintaining a global update sequencing number that is incremented by each updater as it commences update operations and assigns itself said new generation number;
an updater updates said global generation number if said new generation number for said updater's new data element represents the only possible next global generation number;
an updater adds said new generation number for said updater's new data element to a set of stored new generation numbers if said updater's new generation number does not represent the only possible next global generation number; and
an updater updates said global generation number if said set of new generation numbers contains a sequence of new generation numbers that begins with the only possible next global generation number, in which case the last new generation number of said sequence is assigned to be said global generation number and said sequence is removed from said set of new generation numbers.

6. The method of claim 1, wherein said method further includes waiting for a grace period to elapse before updating said global generation number so that readers of said data element group do not need to execute memory barrier instructions prior to reading.

7. A system for supporting concurrent updates to a shared data element group while preserving group integrity on behalf of one or more readers that are concurrently referencing group data elements without using locks or atomic instructions, comprising:
one or more processors;
a memory coupled to said one or more processors, said memory including a computer useable medium tangibly embodying at least one program of instructions executable by said processor to perform operations, comprising:
invoking two or more concurrent updaters to generate new group data elements;
assigning each new data element created by the same updater a new generation number that is different than a global generation number associated with said data element group and which allows a reader of said data element group to determine whether said new data element is a correct version for said reader;
said new generation numbers being different for each updater and being assigned according to an order in which said updaters respectively begin update operations;
performing data element update processing by:
respectively establishing a first version link that links each of said new data elements to a prior version thereof having a different generation number;
respectively establishing a second version link that links each of said new data elements from its prior version; and
respectively establish group links that link said new data elements into said data element group so that said new data elements are reachable by readers;
updating said global generation number associated with said data element group so that when all of said updaters have completed said data element update processing, said global generation number will correspond to said new generation number that is associated with the last of said updaters to begin update operations; and
respectively freeing said prior version, said first version link and said second version link for each of said new data elements following a grace period.

8. The system of claim 7, wherein said updating of said global generation number takes into account said updaters completing said data element update processing in a different order than said updaters begin update operations.

9. The system of claim 7, wherein said updating of said global generation number is performed in one or more stages as groups of one or more of said updaters complete said data element update processing.

10. The system of claim 9, wherein each global generation number update stage produces a global generation number that corresponds to one of said new generation numbers that is the last of a consecutive sequence of one or more new generation numbers associated with updaters that have completed said data element update processing, and wherein the first element of said sequence represents the only possible next global generation number.

11. The system of claim 7, wherein:
said updaters cooperatively assign themselves said new generation numbers by maintaining a global update sequencing number that is incremented by each updater as it commences update operations and assigns itself said new generation number;
an updater updates said global generation number if said new generation number for said updater's new data element represents the only possible next global generation number;
an updater adds said new generation number for said updater's new data element to a set of stored new generation numbers if said updater's new generation number does not represent the only possible next global generation number; and
an updater updates said global generation number if said set of new generation numbers contains a sequence of new generation numbers that begins with the only possible next global generation number, in which case the last new generation number of said sequence is assigned to be said global generation number and said sequence is removed from said set of new generation numbers.

12. The system of claim 7, wherein said method further includes waiting for a grace period to elapse before updating said global generation number so that readers of said data element group do not need to execute memory barrier instructions prior to reading.

13. A computer program product, comprising:
one or more machine-useable media;
logic provided by said one or more media for programming a data processing platform to support concurrent updates to a shared data element group while preserving group integrity on behalf of one or more readers that are concurrently referencing group data elements without using locks or atomic instructions, as by:
invoking two or more concurrent updaters to generate new group data elements;
assigning each new data element created by the same updater a new generation number that is different than a global generation number associated with said data element group and which allows a reader of said data element group to determine whether said new data element is a correct version for said reader;
said new generation numbers being different for each updater and being assigned according to an order in which said updaters respectively begin update operations;
performing data element update processing by:
respectively establishing a first version link that links each of said new data elements to a prior version thereof having a different generation number;
respectively establishing a second version link that links each of said new data elements from its prior version; and
respectively establishing group links that link said new data elements into said data element group so that said new data elements are reachable by readers;
updating said global generation number associated with said data element group so that when all of said updaters have completed said data element update processing, said global generation number will correspond to said new generation number that is associated with the last of said updaters to begin update operations; and
respectively freeing said prior version, said first version link and said second version link for each of said new data elements following a grace period.

14. The computer program product of claim 13, wherein said updating of said global generation number takes into account said updaters completing said data element update processing in a different order than said updaters begin update operations.

15. The computer program product of claim 13, wherein said updating of said global generation number is performed in one or more stages as groups of one or more of said updaters complete said data element update processing.

16. The computer program product of claim 15, wherein each global generation number update stage produces a global generation number that corresponds to one of said new generation numbers that is the last of a consecutive sequence of one or more new generation numbers associated with updaters that have completed said data element update processing, and wherein the first element of said sequence represents the only possible next global generation number.

17. The computer program product of claim 13, wherein:
said updaters cooperatively assign themselves said new generation numbers by maintaining a global update sequencing number that is incremented by each updater as it commences update operations and assigns itself said new generation number;
an updater updates said global generation number if said new generation number for said updater's new data element represents the only possible next global generation number;
an updater adds said new generation number for said updater's new data element to a set of stored new generation numbers if said updater's new generation number does not represent the only possible next global generation number; and
an updater updates said global generation number if said set of new generation numbers contains a sequence of new generation numbers that begins with the only possible next global generation number, in which case the last new generation number of said sequence is assigned to be said global generation number and said sequence is removed from said set of new generation numbers.

18. The computer program product of claim 13, wherein said method further includes waiting for a grace period to elapse before updating said global generation number so that readers of said data element group do not need to execute memory barrier instructions prior to reading.

19. A method for supporting concurrent updates to a shared data element group while preserving group integrity on behalf of one or more readers that are concurrently referencing group data elements without using locks or atomic instructions, comprising:
invoking two or more concurrent updaters to generate new group data elements;
assigning each new data element created by the same updater a new generation number that is different than a global generation number associated with said data element group and which allows a reader of said data element group to determine whether said new data element is a correct version for said reader;
said new generation numbers being different for each updater and being assigned according to an order in which said updaters respectively begin update operations;
performing data element update processing by:
respectively establishing a first version link that links each of said new data elements to a prior version thereof having a different generation number;
respectively establishing a second version link that links each of said new data elements from its prior version; and
respectively establishing group links that link said new data elements into said data element group so that said new data elements are reachable by readers;
updating said global generation number associated with said data element group so that when all of said updaters have completed said data element update processing, said global generation number will correspond to said new generation number that is associated with the last of said updaters to begin update operations;
said updating of said global generation number being performed using a data structure that tracks updaters that have completed said data element update operations out-of-order;
said updating of said global generation number being further performed by setting said global generation number one or more times to correspond to the largest of a sequence of said new generation numbers that are represented by value or by position in said data structure, and which sequence begins with a new generation number that is the only possible next global generation number; and respectively freeing said prior version, said first version link and said second version link for each of said new data elements following a grace period.

20. The method of claim 19, wherein said updating of said global generation number is performed in a manner that allows readers of said data element group to search using a snapshot of said global generation number without implementing a memory barrier to ensure that said global generation number is valid.

* * * * *